US012665638B2

(12) United States Patent
Lu et al.

(10) Patent No.: US 12,665,638 B2
(45) Date of Patent: Jun. 23, 2026

(54) ANTENNA POWER SCALING IN FRONTHAUL LOWER LAYER SPLIT

(71) Applicant: Telefonaktiebolaget LM Ericsson (PUBL), Stockholm (SE)

(72) Inventors: Chenguang Lu, Sollentuna (SE); Yezi Huang, Täby (SE); Miguel Berg, Sollentuna (SE); Björn Pohlman, Järfälla (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 355 days.

(21) Appl. No.: 18/548,243

(22) PCT Filed: Dec. 17, 2021

(86) PCT No.: PCT/SE2021/051286
§ 371 (c)(1),
(2) Date: Aug. 29, 2023

(87) PCT Pub. No.: WO2022/186744
PCT Pub. Date: Sep. 9, 2022

(65) Prior Publication Data
US 2024/0195473 A1     Jun. 13, 2024

Related U.S. Application Data

(60) Provisional application No. 63/155,277, filed on Mar. 1, 2021.

(51) Int. Cl.
*H04B 7/06*      (2006.01)
*H04B 7/0452*      (2017.01)

(52) U.S. Cl.
CPC ......... *H04B 7/0617* (2013.01); *H04B 7/0452* (2013.01)

(58) Field of Classification Search
CPC ............................ H04B 7/0617; H04B 7/0452
See application file for complete search history.

(56) References Cited

U.S. PATENT DOCUMENTS 8,838,051 B1     9/2014 Su et al.
2012/0014415 A1*     1/2012 Su ........................... H04B 7/043
375/140

(Continued)

FOREIGN PATENT DOCUMENTS

WO      WO-2019217391 A1 *   11/2019  ............ H04W 72/23
WO      2020256609 A1    12/2020

OTHER PUBLICATIONS

O-RAN.WG4.CUS.0-v03.00; O-RAN Fronthaul Working Group; Control, User and Synchronization Plane Specification; O-RAN Alliance—2020.

(Continued)

*Primary Examiner* — David Bilodeau
(74) *Attorney, Agent, or Firm* — Baker Botts L.L.P.

(57) ABSTRACT

A method (1700) for antenna power scaling in a fronthaul lower-layer split, LLS, is provided. The method is performed by a baseband unit, BBU (102, 202, 302), for assisting a Radio Unit, RU (104, 204, 304), in scaling a transmit power of one or more antennas when performing beamforming. The method includes transmitting (1702) at least one antenna power scaling factor to the RU for scaling the transmit power of the one or more antennas.

22 Claims, 19 Drawing Sheets

(56) References Cited

U.S. PATENT DOCUMENTS

| | | | |
|---|---|---|---|
| 2016/0248485 A1 | 8/2016 | Kubo et al. | |
| 2019/0373559 A1* | 12/2019 | Davydov | H04W 52/42 |
| 2019/0393948 A1* | 12/2019 | Zhao | H04B 7/0408 |
| 2022/0030611 A1* | 1/2022 | Oteri | H04B 7/024 |
| 2023/0224919 A1* | 7/2023 | Hwang | H04B 7/0617 |
| | | | 370/329 |

OTHER PUBLICATIONS

O-RAN.WG4.CUS.0-V05.00; O-RAN Fronthaul Working Group; Control, User and Synchronization Plane Specification; O-RAN Alliance—2021.
PCT International Search Report issued for International application No. PCT/SE2021/051286—Mar. 22, 2022.
PCT Written Opinion of the International Searching Authority issued for International application No. PCT/SE2021/051286—Mar. 22, 2022.

* cited by examiner

500

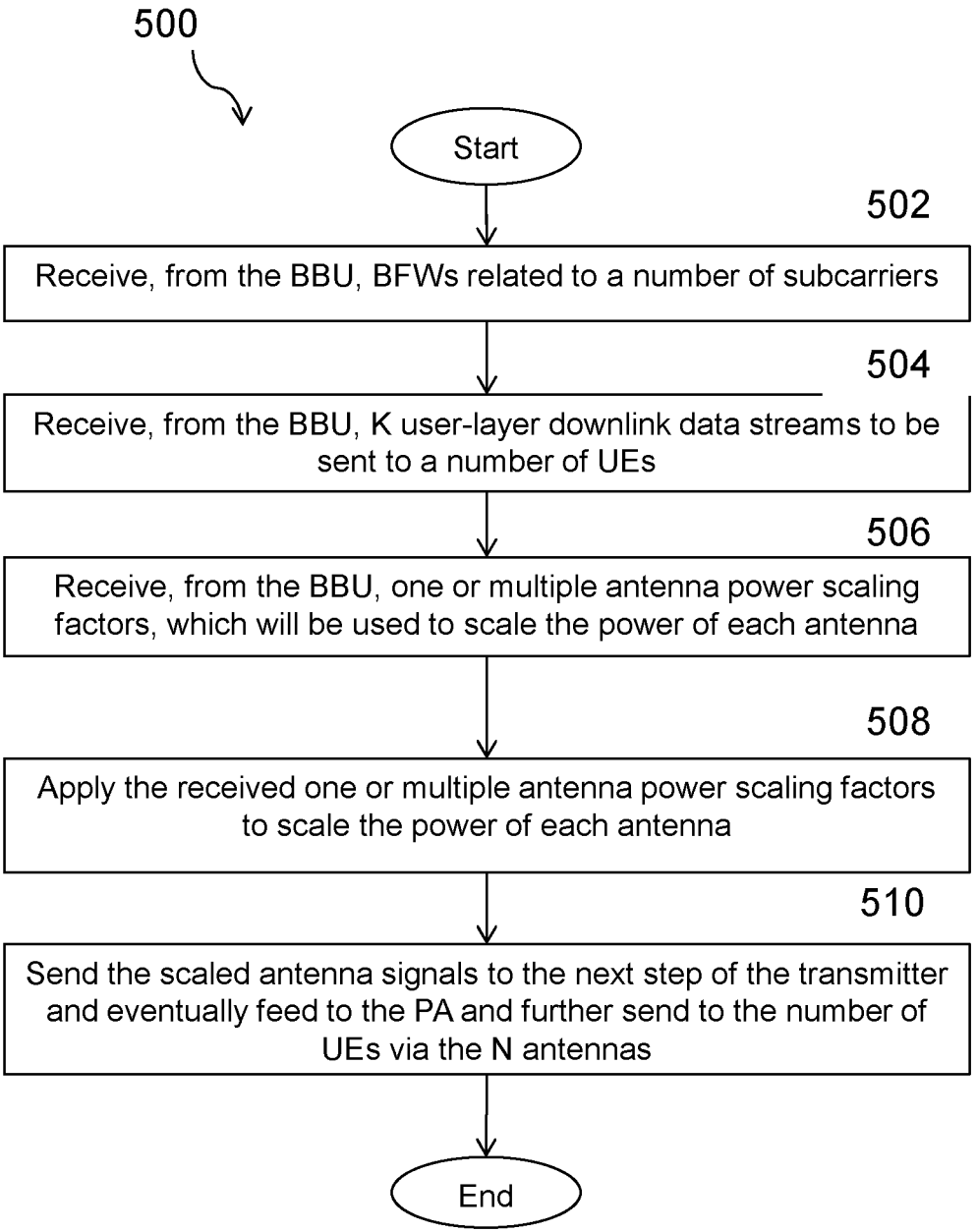

Start

502

Receive, from the BBU, BFWs related to a number of subcarriers

504

Receive, from the BBU, K user-layer downlink data streams to be sent to a number of UEs

506

Receive, from the BBU, one or multiple antenna power scaling factors, which will be used to scale the power of each antenna

508

Apply the received one or multiple antenna power scaling factors to scale the power of each antenna

510

Send the scaled antenna signals to the next step of the transmitter and eventually feed to the PA and further send to the number of UEs via the N antennas End

Receive, from a baseband unit (BBU), at least one antenna power scaling factor for scaling a transmit power of one or more antennas 2200
Virtual Apparatus 2210
Receiving Module

1

ANTENNA POWER SCALING IN FRONTHAUL LOWER LAYER SPLIT

PRIORITY

This nonprovisional application is a U.S. National Stage Filing under 35 U.S.C. § 371 of International Patent Application Serial No. PCT/SE2021/051286 filed Dec. 17, 2021 and entitled "ANTENNA POWER SCALING IN FRONTHAUL LOWER LAYER SPLIT" which claims priority to U.S. Provisional Patent Application No. 63/155,277 filed Mar. 1, 2021, both of which are hereby incorporated by reference in their entirety.

TECHNICAL FIELD

The present disclosure relates, in general, to wireless communications and, more particularly, systems and methods for antenna power scaling in fronthaul lower layer split.

BACKGROUND

Massive Multiple Input Multiple Output (MIMO) techniques have been first adopted to practice in Long Term Evolution (LTE). In $5^{th}$ Generation (5G), it becomes one key technology component, which will be deployed in a much larger scale than in LTE. It features with a large number of antennas used on the base-station side, where the number of antennas is typically much larger than the number of user-layers, for example, 64 antennas serving 8 or 16 user-layers in frequency range 1 (FR1), which comprises sub-6 GHz frequency bands, and 256/512 antennas serving 2 or 4 layers in FR2, which comprises frequency bands from 24.25 GHz to 52.6 GHz. Massive MIMO is also referred to as massive beamforming, which is able to form narrow beams focusing on different directions to counteract against the increased path loss at higher frequency bands. It also benefits multi-user MIMO which allows for transmissions from/to multiple users simultaneously over separate spatial channels resolved by the massive MIMO technologies, while keeping high capacity for each user. Therefore, it can significantly increase the spectrum efficiency and cell capacity.

The great benefits of massive MIMO at the air-interface also introduce new challenges at the base-station side. The legacy Common Public Radio Interface (CPRI)-type fronthaul transports time-domain IQ samples per antenna branch. As the number of antennas scales up in massive MIMO systems, the required fronthaul capacity also increases proportionally, which significantly drives up the fronthaul costs. To address this challenge, the fronthaul interface evolves from Common Public Radio Interface (CPRI) to enhanced CPRI (eCPRI), a packet-based fronthaul interface. In eCPRI, other functional split options between a baseband unit (BBU) and a radio unit (RU) are supported, referred to as different lower-layer split (LLS) options. The basic idea is to move the frequency-domain beamforming function from BBU to RU so that frequency samples or data of user-layers are transported over the fronthaul interface. Note that the frequency-domain beamforming is sometimes also referred to as precoding in the downlink (DL) direction. By doing this, the required fronthaul capacity and thereby the fronthaul costs are significantly reduced, as the number of user layers is much fewer than the number of antennas in massive MIMO.

As used herein, a RU is a network node comprising of radio functions including a portion of physical (PHY) functions according to a LLS option. The RU performs conversion between radio frequency (RF) signals and baseband signals. At the network end, it transmits and receives the baseband signal to and from BBU through a fronthaul interface (e.g., eCPRI). At the other end, it transmits and receives the RF signals to and from UEs through its antennas.

As used herein, a BBU is a network node performing baseband processing. It further connects to the core network with a backhaul interface. Note that BBU and RU are referred to as O-RAN Distributed Unit (O-DU) and O-RAN Radio Unit (O-RU), respectively, in Open Radio Access Network (O-RAN). See, Control, User and Synchronization Plane Specification, O-RAN.WG4.CUS.0-V07.00.

In some terminologies, RU can be also referred to as RRU (remote radio unit) and BBU can also be referred to as a digital unit or distributed unit (DU). In eCPRI terminologies, BBU and RU are referred to as eCPRI Radio Equipment Control (eREC) and eCPRI Radio Equipment (eRE), respectively. In another terminology, BBU and RU may be referred to as LLS-CU and LLS-DU, respectively.

As an example, FIG. 1 illustrates a block diagram of an O-RAN LLS option in the downlink (DL) direction for Cat-B radio. The PHY functional blocks above O-RAN fronthaul (FH) is hosted by an O-DU, whereas the PHY functional blocks below O-RAN FH is hosted by an O-RU. In O-RAN, the frequency-domain beamforming is referred to as "precoding and beamforming" as shown in FIG. 1. As used herein, for convenience, the terms frequency-domain beamforming or beamforming in short are used. Beamforming when used herein, for example, means a technique which multiplying a frequency-domain signal with different weights (in frequency-domain) at multiple antennas, which would cause the signal energy sent to space according to a wanted beam pattern to form a directional beam to concentrate to certain direction or form nulling to certain direction, or the combination of two.

Certain problems exist. For example, with reciprocity-assisted beamforming, the frequency-domain user-layer signals are multiplied with the beamforming weights (BFWs), which converts the user-layer signals to the frequency-domain signals for each antenna of the RU. The beamformed frequency-domain signal of each antenna is further transformed to the time-domain antenna signal by inverse Fast Fourier Transform (IFFT). As a result, the BFWs dynamically scale the signal power per antenna in frequency domain and thereby also equivalently scale the time-domain antenna signal power, as the beamforming weights are updated with the varying channel information and scheduled UEs. Different physical channels (e.g. Physical Downlink Shared Channel (PDSCH), Physical Downlink Control Channel (PDCCH), etc.) can use different BFWs. The user signals in PDSCH and reference signals (e.g., Channel State Information-Reference Signals (CSI-RS)) may also use different beamforming weights. The beamformed time-domain signal per antenna determines the input signal power to power amplifier (PA). If the input signal power to PA is too small, the transmit power from the antennas will be also smaller, which will reduce the received power at user equipments (UEs) and thereby reduce the cell coverage. The DL Signal to Noise Ratio (SNR) may also be reduced, which will reduce the bit rate. If the input signal power to PA is larger than the desired level, PA will get saturated and the transmit signal quality will be degraded due to non-linearity. In the worst case, PA can be damaged when the input signal power is too large. Therefore, it is important for RU to scale the input signal to PA dynamically according to the applied BFWs, such that the power of input signal to the PA stays as closely as possible to the optimal operation point of the PA. Here, we refer to this scaling operation as antenna power scaling. Note, however, that the transmit power of certain resource elements (RE) is not to be scaled. Examples of these REs are corresponding to CSI-RS, TRS (Tracking Reference Signal), PSS (Primary Synchronization Signal), SSS (Secondary Synchronization Signal), etc., which are related to the cell coverage.

In O-RAN, O-DU performs channel estimation based on the received uplink (UL) reference signals, e.g., sounding reference signal (SRS), calculates the BFWs based on the estimated channel, and then sends the BFWs to O-RU. The O-RU performs beamforming with the received BFWs. In the current O-RAN spec, antenna power scaling specific to BFWs is not defined. If O-RU doesn't do any power scaling, the transmit signal power may be lower than if it would be scaled, which would cause reduced beamforming coverage and SNR, causing lower bit rate to UEs. If O-RU would do an additional scaling to address this issue, the current O-RAN spec gives the O-RU full freedom to scale the antenna power for its own interest. Different O-RU vendors may have different scaling approaches. O-DU is not aware of how O-RU would do the scaling. This may degrade the beamforming performance because O-RU and O-DU are not coordinated with respect to antenna power scaling. For example, O-RU may scale the transmit power at a lower level than the expected level from O-DU. Again, lower power causes smaller beamforming coverage or lower SNR than expected. O-RU may also scale each antenna element differently and in a way that may cause beamforming performance degradation since it fails at nulling some interferences. When CSI-RS have different transmit power than the PDSCH, the mismatch cannot be compensated by O-DU as it does not know how the antenna power scaling has been done differently for CSI-RS and PDSCH by the O-RU, and thereby causes problems for link adaptation, which may reduce bit rate.

Therefore, this can cause significant interoperability issues between O-DU and O-RU, if O-RU antenna power scaling is not coordinated with O-DU. If O-RU doesn't do any antenna power scaling, the performance would be degraded by lower transmit power of O-RU.

One way to address this issue is that the BFWs are scaled by the antenna power scaling factor before they are sent to O-RU. In this way, the antenna power will be scaled properly and controlled by O-DU. However, this may dramatically increase the instantaneous bit rate for sending the BFWs, which would increase the fronthaul cost. The reason is that the antenna power scaling factor can be calculated only after the BFWs of all subcarriers or all subcarrier groups (one subcarrier group comprising multiple subcarriers, which will share the same BFWs) are calculated and available. The calculation of BFWs of different subcarriers or subcarrier groups are performed in time. The BFWs already calculated have to wait until all BFWs are calculated before being sent to the O-RU. It means that the BFW transport time budget is reduced since all BFWs need to arrive before a specific time limit and the start time to transport is delayed due to the scaling. Therefore, this would dramatically increase the fronthaul bit rate because of sending the same amount of BFW data in a shorter time.

SUMMARY

Certain aspects of the present disclosure and their embodiments may provide solutions to these or other challenges. For example, according to certain embodiments, methods and systems are provided to conduct antenna power scaling controlled by the BBU. More specifically, according to certain embodiments, antenna power scaling factors are calculated by the BBU based on the calculated beamforming weights (BFWs) that are expected to be applied to some or all subcarrier within the scheduled bandwidth. The calculated antenna power scaling factors are then sent from the BBU to the RU. The RU applies the received antenna power scaling factors either on the BFWs, or on the frequency-domain In-phase and Quadrature (IQ) samples/data, or on the time-domain IQ samples/data.

According to certain embodiments, a method for antenna power scaling in a fronthaul LLS is performed by a BBU for assisting a RU in scaling a transmit power of one or more antennas when performing beamforming. The method includes transmitting at least one antenna power scaling factor to the RU for scaling the transmit power of the one or more antennas.

According to certain embodiments, a BBU is provided for assisting a RU in scaling a transmit power of one or more antennas when performing beamforming. The BBU is adapted to transmit at least one antenna power scaling factor to the RU for scaling the transmit power of the one or more antennas.

According to certain embodiments, a method by a RU includes one or more antennas for performing beamforming for a communication between the RU and at least one wireless device. The method includes receiving, from a BBU, at least one antenna power scaling factor for scaling a transmit power of the one or more antennas.

According to certain embodiments, a RU includes one or more antennas for performing beamforming for a communication between the RU and at least one wireless device. The RU is adapted to receive, from a BBU, at least one antenna power scaling factor for scaling a transmit power of the one or more antennas.

Certain embodiments may provide one or more of the following technical advantages. For example, one technical advantage may be that certain embodiments are applicable in a multi-vendor environment when the BBU and RU are from different vendors. The BBU has full control of the antenna power scaling algorithms. Consistent beamforming behavior and performance can be achieved as expected from the BBU even with RUs from different vendors. As such, certain embodiments may solve all of the issues discussed above.

As another example, a technical advantage may be that certain embodiments for calculating the antenna power scaling factors by the BBU are agnostic to the RU. As such, the BBU vendors has full freedom for antenna power scaling algorithm design, which can differentiate from other vendors, without having to tell the RU vendor about algorithm details. The standards like O-RAN does not need to specify all possible scaling algorithms and make the specification easier to maintain. These advantages make the solution having less issues for interoperability, as RU only needs to apply the received scaling factors from the BBU without implementing detailed algorithms.

Additionally, a technical advantage may be that the added overhead for sending the antenna power scaling factors is low. Maximally, one value per antenna per Orthogonal Frequency Division Multiplexing (OFDM) symbol is sent to RU. For example, for a RU with 64 antennas, maximally 64 values are sent per OFDM symbol. If multiple carriers are transmitted over the same set of antennas, each carrier might need individual scaling factors per antenna.

As yet another example, another technical advantage may be that the BFWs can be sent from the BBU to the RU immediately after they are calculated. The BBU doesn't have to wait until the antenna power scaling is calculated. As such, the bit rate for transporting the BFWs would be much lower than the case if BFWs are scaled first and then sent, as described before.

As still another example, a technical advantage may be that, apart from optimizing transmit power per antenna as mentioned, certain embodiments may be used, for example, for dynamic tapering of arrays, by scaling down weights (lower power) at the edge of the panel for some OFDM symbols. Tapering causes power loss and is therefore not desirable when scheduling users near the cell edge, but can be used to reduce interference in OFDM symbols where there are no users on the cell edge.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 6 illustrates a method by a RU for performing beamforming for a communication between a base station and a UE in a wireless communications network adapted to use a multiple antenna system for communication, according to certain embodiments;

DETAILED DESCRIPTION

Figure 1:
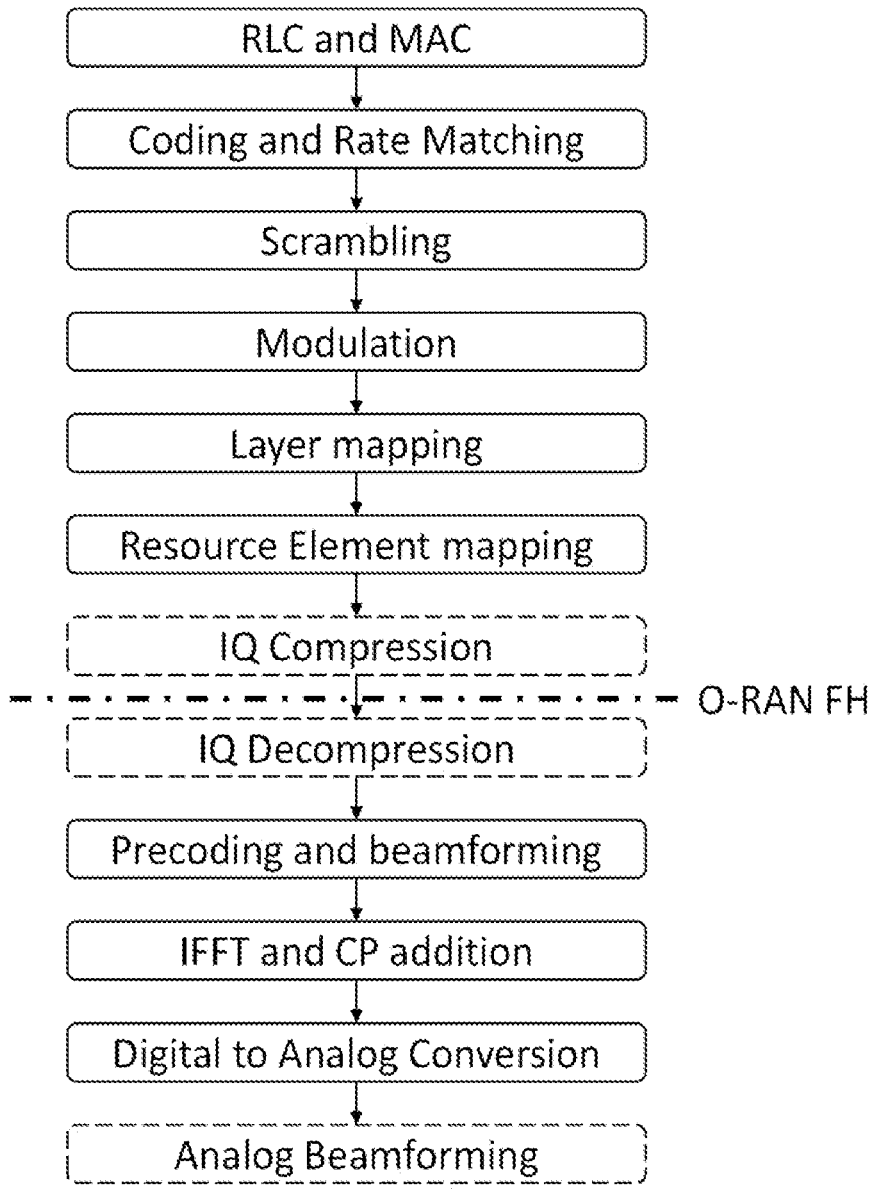
FIG. 1 illustrates a block diagram of an O-RAN LLS option in the DL direction for Cat-B radio.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

As used herein, it is to be noted that BBU could be for example an O-RAN O-DU, RU could be an O-RAN O-RU, and the FH interface could be an O-RAN Fronthaul interface.

As used herein, the term antenna can be an antenna subarray connected to the same PA and transceiver chain. An antenna used here is also referred to as a TRX in O-RAN terminology.

Additionally, as used herein, the term of BBU may be generally used in the place of O-DU. Likewise, the term RU may be generally used in the place of O-RU. Note the BBU or O-DU can be implemented by software or virtualized as Baseband Processing Function in a Cloud environment.

Certain embodiments described herein may be used for Cat-A O-RU with digital beamforming implemented in O-RU.

Figure 2:
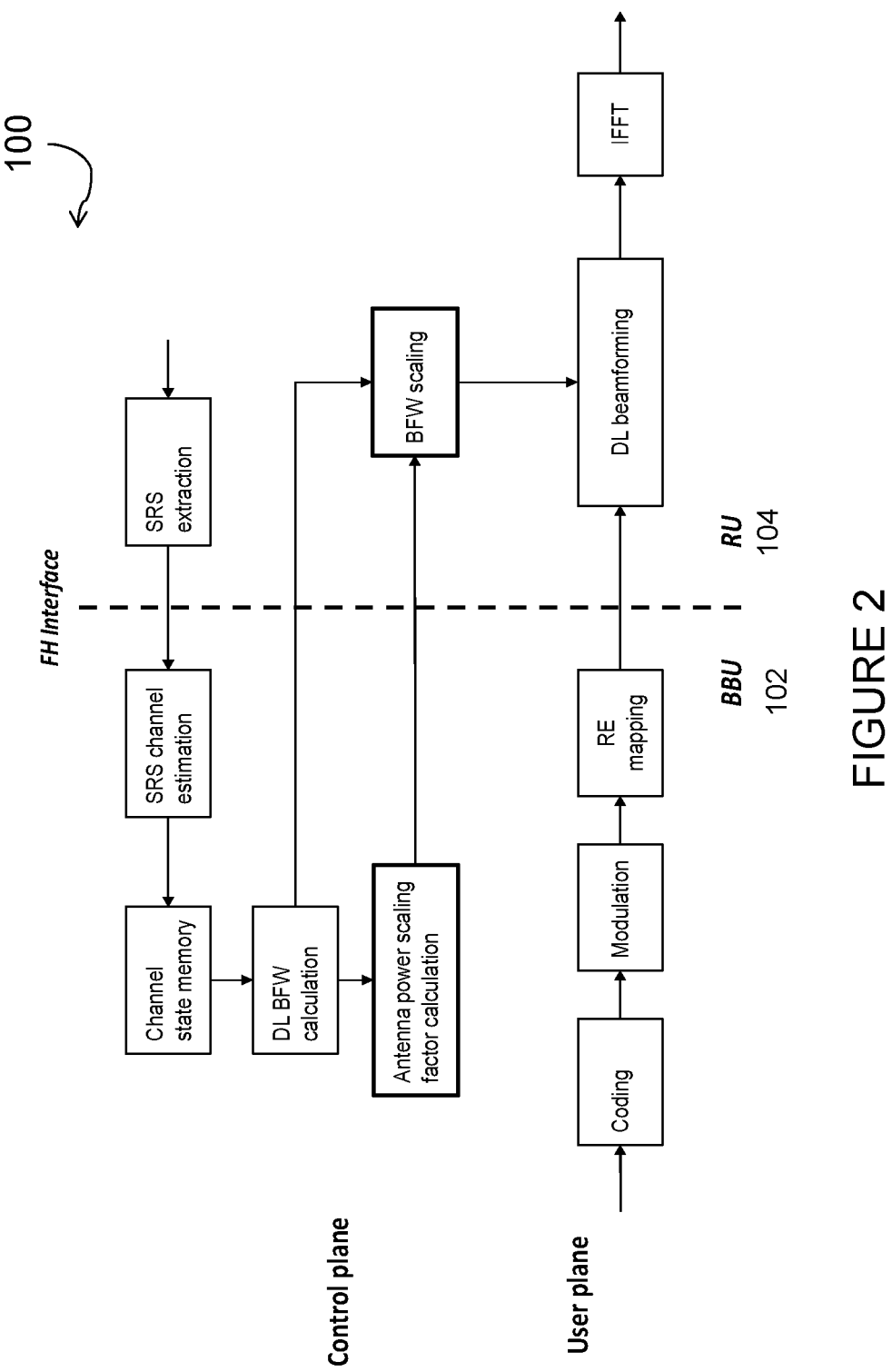
FIG. 2 illustrates an example block diagram with RU implementation according to a first embodiment.
Figure 3:
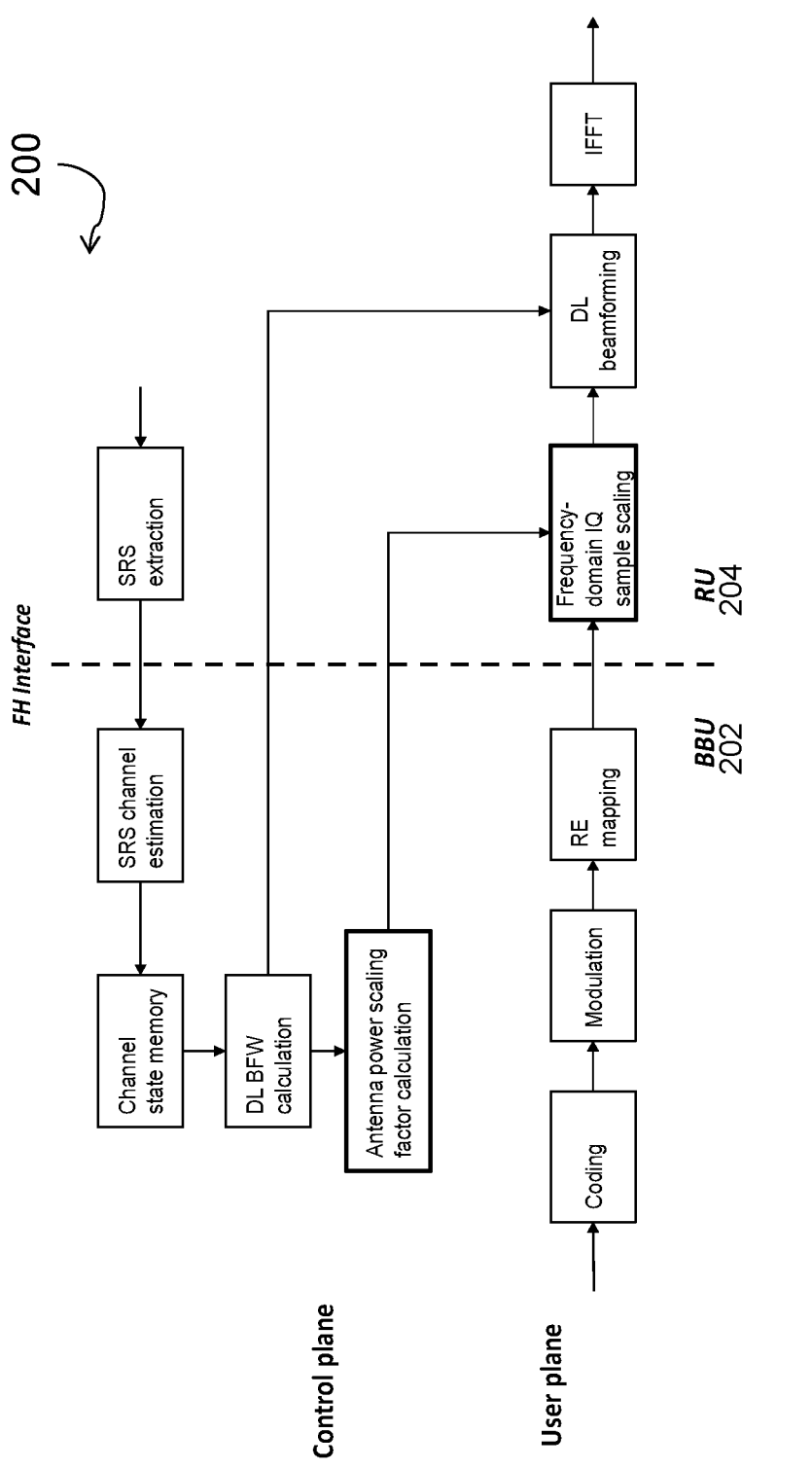
FIG. 3 illustrates another block diagram with RU implementation according to a second embodiment.
Figure 4:
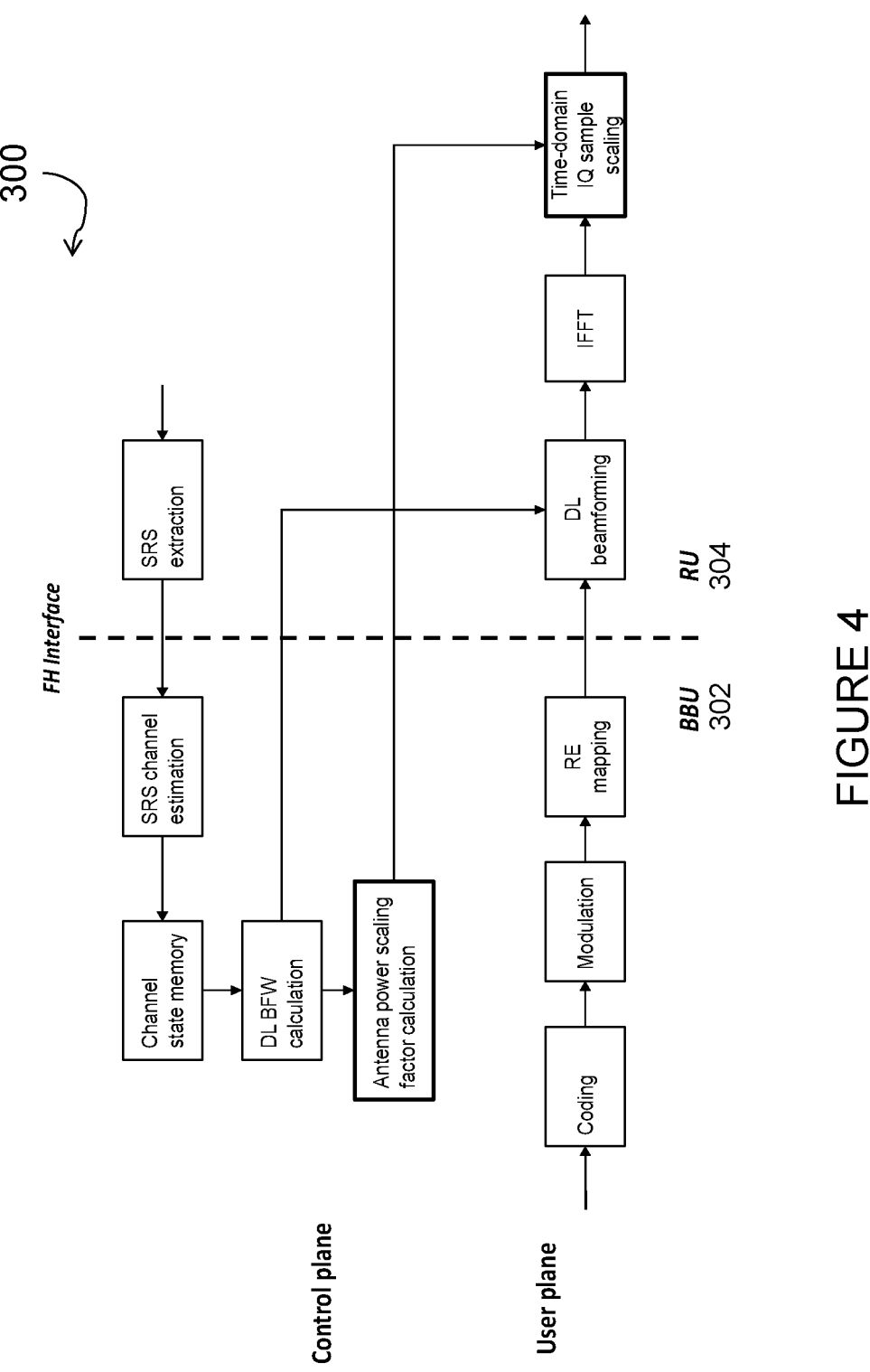
FIG. 4 illustrates another block diagram with RU implementation according to a third embodiment.
Figure 5:
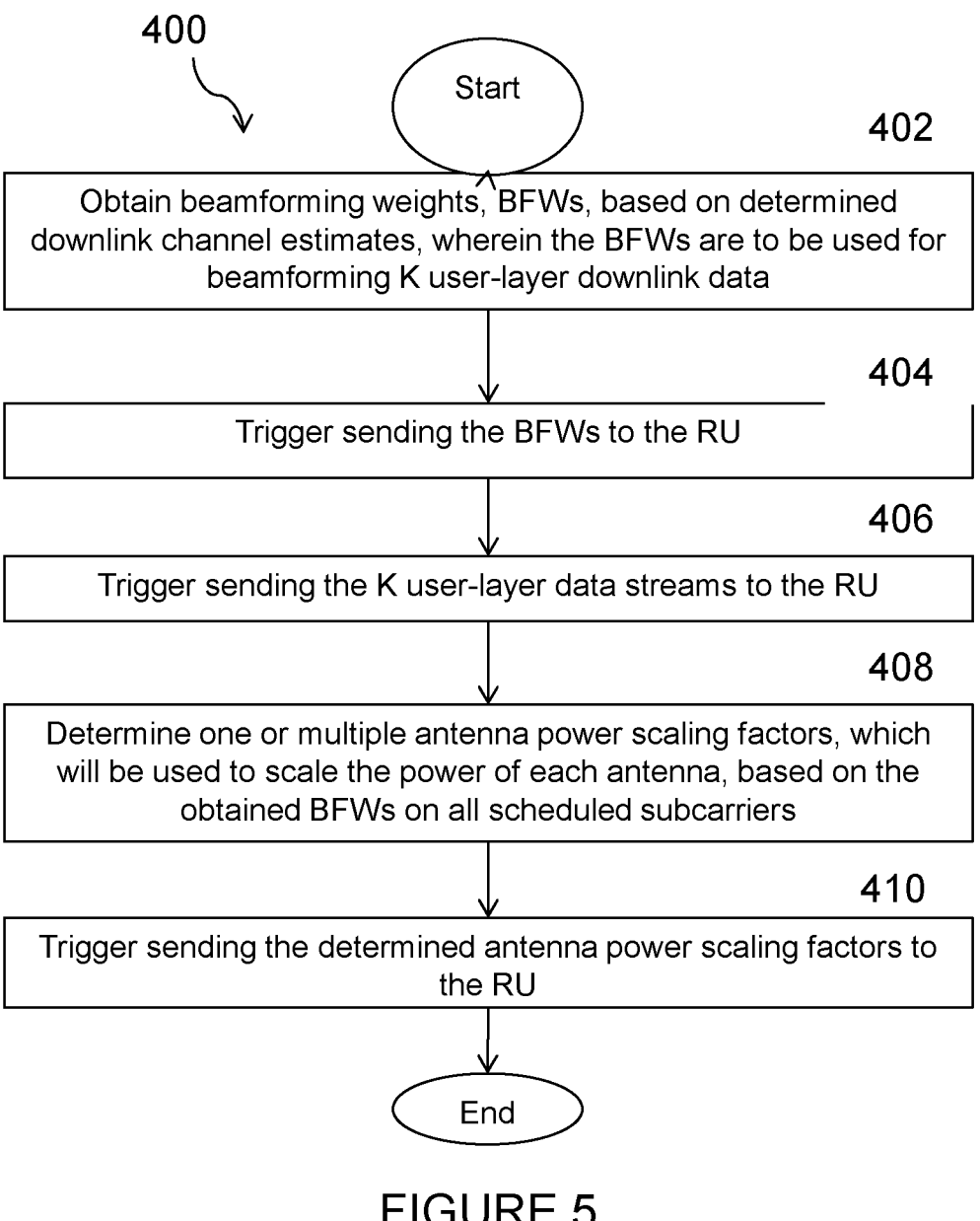
FIG. 5 illustrates a method by a BBU for assisting a RU in scaling the antenna transmit power when performing beamforming for a communication between a base station and a UE in a wireless communications network using a multiple antenna system for communication, according to certain embodiments.

FIGS. 2, 3, and 4 illustrate block diagrams considering various O-RAN Cat-B radio implementation. There can be three embodiments for the RU to apply the antenna power scaling factors which are received from the BBU. As such, FIG. 2 illustrates an example block diagram with an example implantation 100 with a BBU 102 and RU 104, according to a first embodiment. FIG. 3 illustrates another block diagram with another example implementation 200 with a BBU 202 and RU 204, according to a second embodiment. FIG. 4 illustrates another block diagram with another implementation 300 with a BBU 302 and RU 304, according to a third embodiment. Blocks with bold lines emphasize new functions, according to certain embodiments described herein. Methods at the BBU FIG. 5 illustrates a method 400 by a BBU for assisting a RU in scaling the antenna transmit power when performing beamforming for a communication between a base station and a UE in a wireless communications network using a multiple antenna system for communication, according to certain embodiments. The BBU and the RU are associated with a distributed base station system. In a distributed base station system, base station functionality is split between a base band unit (BBU) and a radio unit (RU). The RU is connected to the BBU via a fronthaul (FH) interface or link. The BBU and the RU can be deployed at the same location, e.g. the cell site. Alternatively, BBU can be deployed at a different location than the RU.

As shown in FIG. 5, the method 400 includes the following steps, which are now described in more detail:

At step 402, obtaining beamforming weights, BFWs, based on determined DL channel estimates, wherein the BFWs are to be used for beamforming K user-layer DL data to be sent to a number of UEs via N antennas at the RU.

The DL channel estimate is an estimate of the communication channel between the RU and the UEs. For wireless communication networks based on technology that is reciprocal in the air, such as Time-Division Duplex (TDD)-based technologies, the DL channel estimate can be determined rather accurate from UL signals. When channel estimation is accurate, e.g. when SINR is high, such an approach performs even better than a codebook-based approach. In Time Division Duplex (TDD), for example, any difference between UL and DL channel is mainly from the radio frontend difference in UL and DL, which difference can be calibrated out. The UL signals may be reference signals originating from the number of UEs, such as SRS (sounding reference signal), DMRS (demodulation reference signal), etc. The reference signals may be the same reference signals from the UEs or different signals. They may be sent simultaneously or at different times.

BFWs to be sent to the RU may be normalized or scaled according to certain power scaling criteria.

Each column of the BFW matrix on the respective subcarriers may be normalized based on the power of the BFW element which has the highest power value.

Each column of the BFW matrix on the respective subcarriers may be normalized based on the total power of BFW elements in the column.

At step 404, triggering sending the BFWs to the RU.

BFWs to be sent to the RU may be related to a portion of subcarriers out of the scheduled subcarriers. For example, a group of subcarriers share one set of BFWs.

BFWs to be sent to the RU may be compressed with fewer bits than that used for BFW calculation.

BFWs may be sent together with other control information assisting the beamforming operation at the RU. For example, in O-RAN, BFWs are sent together with other scheduling information (regarding symbol index per slot, resource block number, RE number per resource block) used for user data transmission) using the C-plane (control plane) messages.

At step 406, triggering sending the K user-layer data streams to the RU.

Note: in O-RAN, the user-layer data are sent using U-plane (user plane) messages corresponding to the C-plane messages, which indicates how each received user-layer data are scheduled in time (symbol index per slot) and frequency (resource block number and RE number) resources.

At step 408, determining one or multiple antenna power scaling factor, which will be used to scale the transmit power of each antenna, based on the obtained BFWs, counting the power contribution of BFWs on all scheduled subcarriers.

The antenna power scaling factors are for any of the N antenna elements at the RU. The N antenna elements at the RU can share the same power scaling factor, i.e., a single power scaling factor for all N antenna elements, or can use independent power scaling factors.

The one or multiple antenna power scaling factors are recalculated once the BFWs are updated. For example, if the BFWs are updated every OFDM symbol, then the antenna power scaling factors are also calculated and sent every OFDM symbol.

Embodiments of methods for calculating the antenna power scaling factors regarding the optimal operation point of the PA are further described in below.

If not BFWs on all subcarriers of the scheduled subcarriers have been obtained, counting the power contribution of BFWs on the remaining subcarriers based on power contribution of the obtained BFWs. In one embodiment, this is pertaining to the scheme that the RU is used to determine BFWs on the remaining subcarriers based on the received BFWs from the BBU.

Note: The result of the antenna power scaling factors is determined after all BFWs are calculated. Before the antenna power scaling factor is determined, the BFWs already calculated can be sent first, which do not need to wait until antenna power scaling factors are determined. This gives more time for BFWs to send, which reduce the overall required bit rate for sending BFWs.

At step 410, triggering sending the determined antenna power scaling factors to the RU.

In O-RAN, the signaling for sending the antenna power scaling factors should be carried by a Control-plane (C-plane) message, which is sent to the O-RU before the user-plane (U-plane) data. A new Section Type or Section Extension may be needed. Such a new Section Type may not be associated with any user-plane messages, since this is for antenna power scaling per antenna per symbol, not used for UE-specific scheduling. In this case, a message of new Section Type or Section Extension is sent from BBU to RU every time the BFWs are changed. This is fully controlled by BBU. If BBU determines it is okay to reuse the previous antenna scaling factors, it may not send new antenna power scaling factors.

The antenna power scaling factors can be encoded in a number of bits. As an example, if we have 64 antennas and use 16 bits per scaling factor, the number of bits to send are 64×16=1024 bits. Note that the scaling factor can be represented with other than 16 bits also, e.g., fewer than 16 bits.

It is here noted that though the ordering of the steps as shown in FIG. 5 and described herein is provided for illustration and example purposes only. It is recognized that the ordering of the steps may vary within the scope of this disclosure. For example, steps 408 and 410 may happen before step 406, in some embodiments. Specifically, in O-RAN, the control-plane messages (e.g., those transmitted at step 410) are required to be sent before the corresponding user plane messages (e.g., those transmitted at step 406). Therefore, in the O-RAN context, step 410 may happen before step 406.

Additionally or alternatively, step 408 can be performed during the time of step 402 and step 404. For example, after some BFWs are calculated, the BBU can start to calculate the scaling factors at step 408. Thus, steps 402, 404 and 408 can be pipelined, i.e. parallelly processed in some overlapped time. However, the final result of scaling factors will be transmitted at step 410 after all BFWs are available.

Methods at the RU

FIG. 6 illustrates a method 500 by a RU for performing beamforming for a communication between a base station and a UE in a wireless communications network adapted to use a multiple antenna system for communication, according to certain embodiments. The RU are associated with the base station.

As shown in FIG. 6, the method 500 by the RU includes the following steps, which are now described in more detail:

At step 502, receiving, from the BBU, BFWs related to a number of subcarriers.

If the received BFWs are compressed, the method further comprises reconstructing of the BFWs.

In O-RAN BFWs are carried by the C-plane messages, assisted by scheduling information which is also carried by the C-plane messages.

At step 504, receiving, from the BBU, K user-layer downlink data streams to be sent to a number of UEs.

Note: when K=1, it is to be sent to one UE.

At step 506, receiving, from the BBU, one or multiple antenna power scaling factors, which will be used to scale the transmit power of each antenna.

In O-RAN, this can be carried by a C-plane message with certain periodicity, for example, per symbol. This may require a new control-plane Section Type or Section Extension supporting this feature.

Though not explicitly shown in FIG. 6, if not BFWs on all subcarriers of the scheduled subcarriers have been received, obtaining BFWs on the remaining subcarriers based on the received BFWs. They can be obtained by any one or more out of:

repeating the received BFWs for neighboring subcarriers of the remaining sub-carriers, interpolating the received BFWs for the remaining subcarriers.

In one embodiment, BBU is aware of how this is performed by RU.

At step 508, applying the received one or multiple antenna power scaling factors according to one of the following 3 possible implementations, to result in the same scaling effect to the time-domain signal per antenna before feeding to the PA of each antenna branch.

The antenna power scaling factors can be applied to the received BFWs from BBU on the IQ samples of the scheduled subcarriers (as exemplified in FIG. 2) that are to be scaled. By applying, the antenna power scaling factor for antenna index n, with n=1, . . . , N, which can either be a shared or dedicated antenna power scaling factor, is multiplied with the BFWs related to antenna index n on the respective subcarriers.

The antenna power scaling factors can be applied to the frequency-domain IQ samples of the user-plane data stream before it is multiplied with the BFWs related to each antenna (as exemplified in FIG. 3). By applying, the antenna power scaling factor for antenna index n, with n=1, . . . , N, which can either be a shared or dedicated antenna power scaling factor, is multiplied with the frequency-domain IQ samples related to antenna index n on the respective subcarriers.

The antenna power scaling factors can be applied to the time-domain IQ samples of the user-plane data stream of each antenna (as exemplified in FIG. 4). By applying, the antenna power scaling factor for antenna index n, with n=1, . . . , N, which can either be a shared or dedicated antenna power scaling factor, is multiplied with the time-domain IQ samples related to antenna index n on the respective subcarriers.

Note that certain REs are not to be scaled, as described before. Examples of these REs are corresponding to CSI-RS, TRS (Tracking Reference Signal), PSS (Primary Synchronization Signal), SSS (Secondary Synchronization Signal), etc., which are related to the cell coverage. Therefore, in the first two implementations above, the scaling is applied to the REs or subcarriers which are to be scaled. In the third implementation above, the scaling is only applied to symbols which don't include the REs which are not to be scaled.

At step 510, sending the scaled antenna signals to the next step of the transmitter and eventually feed to the PA and further send to the number of UEs via the N antennas.

It is here noted that though the ordering of the steps as shown in FIG. 6 and described herein is provided for illustration and example purposes only. It is recognized that the ordering of the steps may vary within the scope of this disclosure. For example, steps 506 may happen before step 504, in some embodiments. Specifically, in O-RAN, the control-plane messages (e.g., those transmitted at step 506) are required to be sent before the corresponding user plane messages (e.g., those transmitted at step 504). Therefore, in the O-RAN context, step 506 will happen before step 504.

Methods for Calculating Antenna Power Scaling Factor(s) Regarding the Optimal Operation Point of the PA According to certain embodiments, L may be used to denote the number of scheduled subcarriers. Let $W(l) \in \mathbb{C}^{N \times K}$ denote the downlink BFW matrix (in antenna-element-domain) on subcarrier l for l=1, . . . , L regarding K scheduled user-layers and N antenna elements. The contribution of W(l) to the transmit power of n-th antenna is $$g_n(l) = \Sigma_{j=1}^{K} \|w_{n,j}(l)\|_2^2,$$

where $w_{n,j}(l)$ denotes the element at the n-th row and the j-th column of W(l).

Without loss of generality, assume the average power from each user-layer on each subcarrier is scaled to be β (normally, β=1), the maximum expected power on one antenna element is $$g_{max} = \beta K_{max} L_{max}/N,$$

where $K_{max}$ is the maximum number of user-layers the base station system supports and $L_{max}$ is the total number of subcarriers available of the carrier. For example, 100 MHz 5G NR (New Radio) with 30 kHz subcarriers spacing has 273×12=3276 subcarriers.

If it is desirable to scale to the power of the scheduled subcarriers by keeping the same transmit power spectral density (PSD), the maximum expected power of the scheduled subcarriers (L subcarriers) on one antenna element is $$g_{max} = \beta K_{max} L/N.$$

In the following, two methods are described regarding how antenna power scaling is calculated. It shows that there are more than one possible scaling methods in different cases. With this invention, the scaling is fully controlled by the BBU. This makes interoperability easier between BBU and RU. Otherwise, the FH interface standard has to specify all these possibilities for a RU to implement. This would make RU more complex.

1. A Shared Antenna Power Scaling Factor for all Antenna Elements

According to certain embodiments, a method may be used to scale the antenna transmit power to the antenna which have the highest power. All antennas use the same scaling factor. In this way, the power of each antenna will not exceed the limit. Specifically, not all antennas will transmit at its maximum transmit power. In most cases, only one antenna will transmit at the maximum transmit power, while other antennas will transmit with lower power. The advantage of this kind of antenna power scaling is that it does not affect the nulling performance for interference cancellation between K user layers.

The antenna scaling factor (single scalar) of this method is expressed as $$\alpha = \sqrt{\frac{g_{max}}{\max_n g_n}}$$

Effectively, the transmit signal in frequency-domain on subcarrier l from antenna n is $$y_n(l) = \alpha w_n^T(l)x(l),$$

where $$w_n^T(l)$$

denotes the vector of the n-th row of W(l) and $x(l) \in \mathbb{C}^{K=1}$ denotes the frequency-domain signal of K user layers before beamforming.

2. Dedicated Antenna Power Scaling Factor for Each Antenna Element

According to certain other embodiments, each antenna can transmit at its highest transmit power, since each antenna has its own antenna scaling factor. However, the BFWs W(l) are derived with respect to a channel matrix H(l). Scaling each antenna transmit power to the maximum value transforms the channel matrix equivalently to be H(l)A, where A=diag($\alpha_1$ . . . $\alpha_N$), which may degrade the beamforming performance since the BFW will not be able to fully cancel all the interferences between K user layers. But it may benefit when the interference is not the dominant factor.

For this method, the antenna scaling factor for antenna n is $$\alpha_n = \sqrt{\frac{g_{max}}{g_n}}$$

$$l n y_n(l) = \alpha_n w_n^T(l)x(l)$$

Effectively, the transmit signal on subcarrier from antenna is ln

Note that the above examples assume to scale all subcarriers. When there exist REs or subcarriers which are not to be scaled, the scaling factor will consider both the subcarriers to be scaled and not to be scaled, such that the desired power scaling is achieved by scaling only the subcarriers to be scaled.

Figure 7:
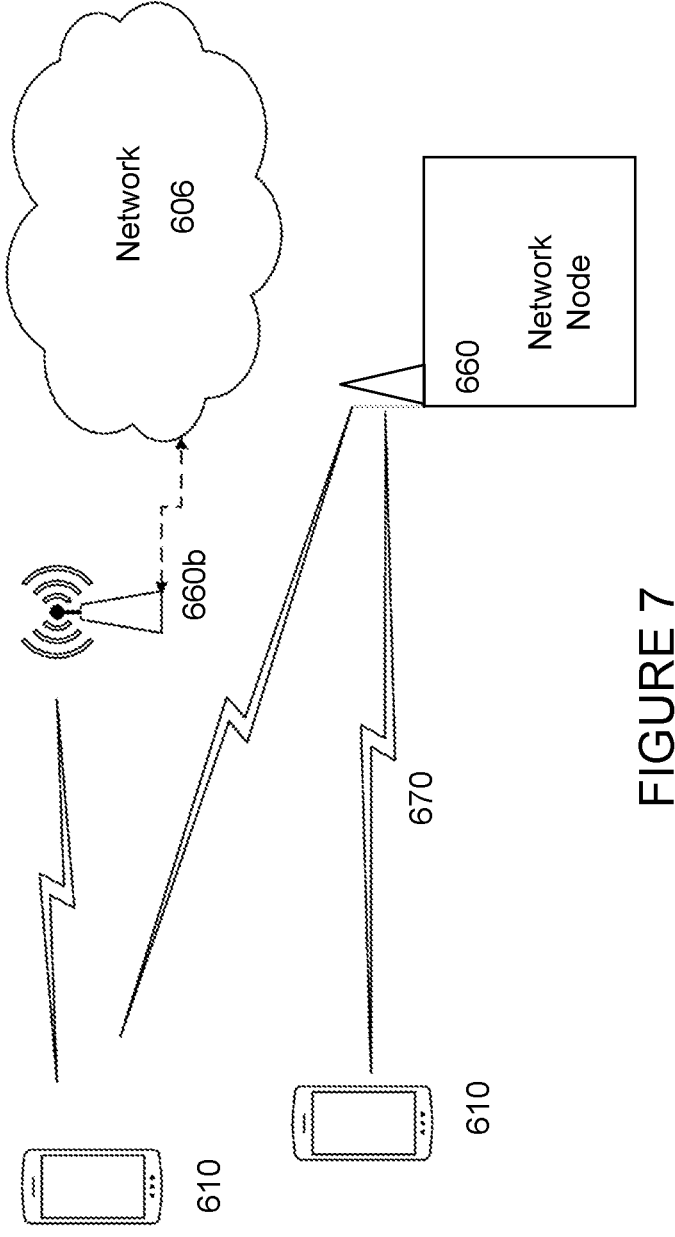
FIG. 7 illustrates an example wireless network, according to certain embodiments.

FIG. 7 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 606, network nodes 660 and 660b, and wireless devices 610. In practice, a wireless network may further include any additional elements suitable to support communication between wireless devices or between a wireless device and another communication device, such as a landline telephone, a service provider, or any other network node or end device. Of the illustrated components, network node 660 and wireless device 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and wireless device 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 8:
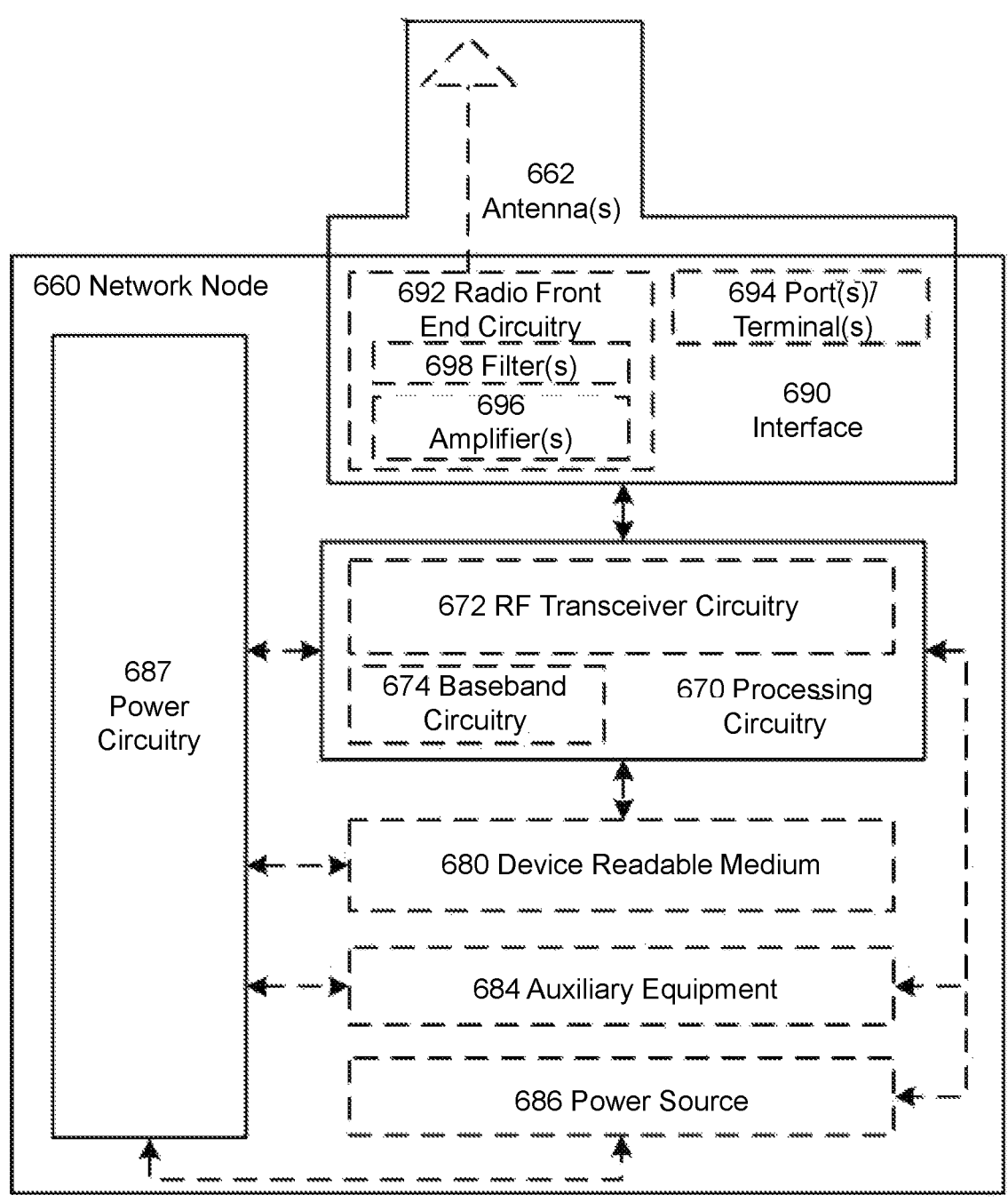
FIG. 8 illustrates an example network node, according to certain embodiments.

FIG. 8 illustrates an example network node 660, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed base station system such as centralized digital units and/or remote radio units (RRUs), sometimes referred to as Remote Radio Heads (RRHs). Such remote radio units may or may not be integrated with an antenna as an antenna integrated radio. Parts of a distributed base station system may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 660 includes processing circuitry 670, device readable medium 680, interface 690, auxiliary equipment 684, power source 686, power circuitry 687, and antenna 662. Although network node 660 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660 but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or wireless devices 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or wireless devices via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 692 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 8 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

Figure 9:
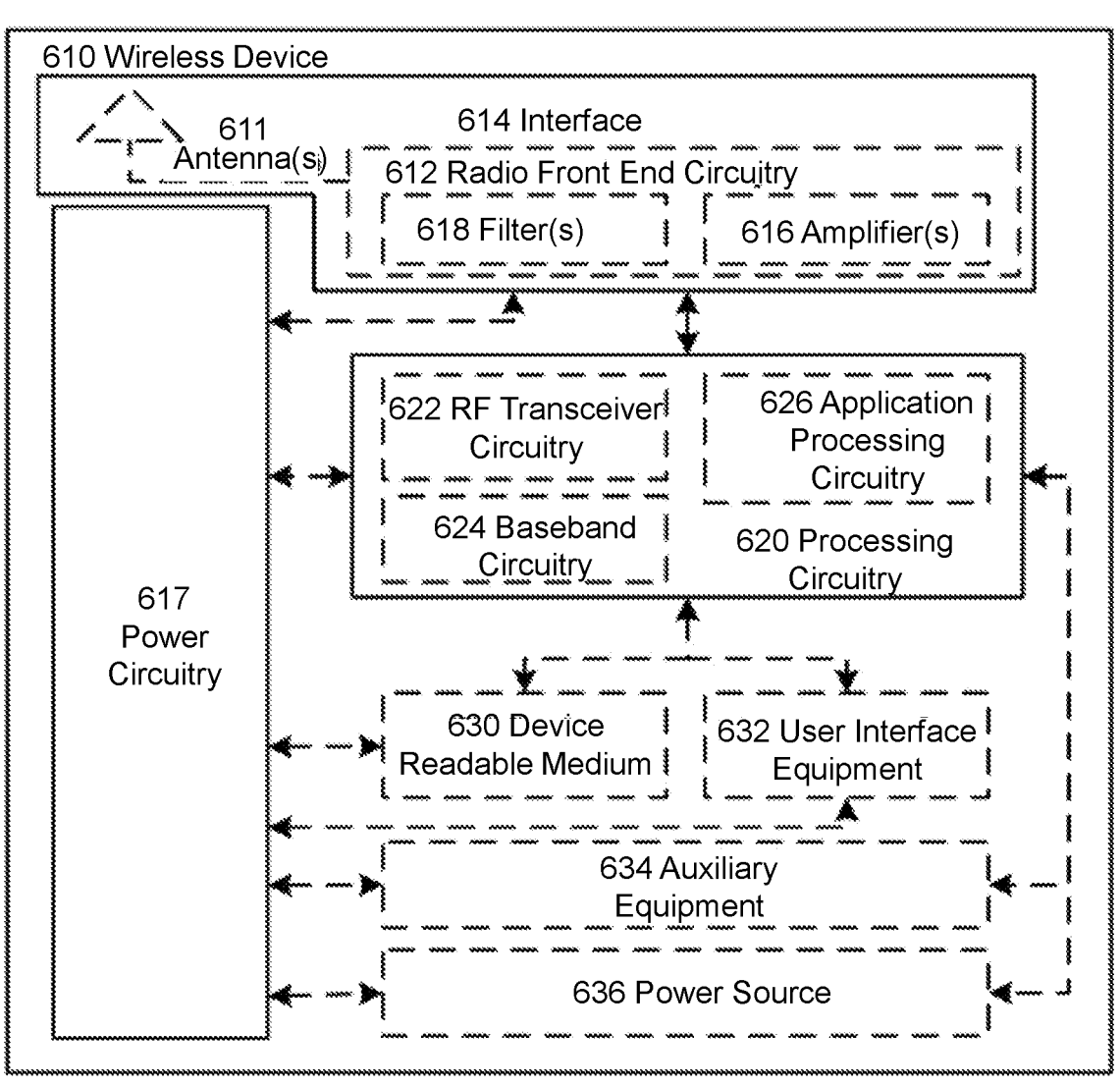
FIG. 9 illustrates an example wireless device, according to certain embodiments.

FIG. 9 illustrates an example wireless device 610. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. Wireless device 610 may include multiple sets of one or more of the illustrated components for different wireless technologies supported by wireless device 610, such as, for example, GSM, WCDMA, LTE, NR, WiFi, WiMAX, or Bluetooth wireless technologies, just to mention a few. These wireless technologies may be integrated into the same or different chips or set of chips as other components within wireless device 610.

Antenna 611 may include one or more antennas or antenna arrays, configured to send and/or receive wireless signals, and is connected to interface 614. In certain alternative embodiments, antenna 611 may be separate from wireless device 610 and be connectable to wireless device 610 through an interface or port. Antenna 611, interface 614, and/or processing circuitry 620 may be configured to perform any receiving or transmitting operations described herein as being performed by a wireless device. Any information, data and/or signals may be received from a network node and/or another wireless device. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 612 is connected to antenna 611 and processing circuitry 620 and is configured to condition signals communicated between antenna 611 and processing circuitry 620. Radio front end circuitry 612 may be coupled to or a part of antenna 611. In some embodiments, wireless device 610 may not include separate radio front end circuitry 612; rather, processing circuitry 620 may comprise radio front end circuitry and may be connected to antenna 611.

Similarly, in some embodiments, some or all of RF transceiver circuitry 622 may be considered a part of interface 614. Radio front end circuitry 612 may receive digital data that is to be sent out to other network nodes or wireless devices via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 610 components, such as device readable medium 630, wireless device 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of wireless device 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a wireless device may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hardwired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of wireless device 610, but are enjoyed by wireless device 610 as a whole, and/or by end users and the wireless network generally.

Processing circuitry 620 may be configured to perform any determining, calculating, or similar operations (e.g., certain obtaining operations) described herein as being performed by a wireless device. These operations, as performed by processing circuitry 620, may include processing information obtained by processing circuitry 620 by, for example, converting the obtained information into other information, comparing the obtained information or converted information to information stored by wireless device 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with wireless device 610. Such interaction may be of many forms, such as visual, audial, tactile, etc. User interface equipment 632 may be operable to produce output to the user and to allow the user to provide input to wireless device 610. The type of interaction may vary depending on the type of user interface equipment 632 installed in wireless device 610. For example, if wireless device 610 is a smart phone, the interaction may be via a touch screen; if wireless device 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into wireless device 610 and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from wireless device 610, and to allow processing circuitry 620 to output information from wireless device 610. User interface equipment 632 may include, for example, a speaker, a display, vibrating circuitry, a USB port, a headphone interface, or other output circuitry. Using one or more input and output interfaces, devices, and circuits, of user interface equipment 632, wireless device 610 may communicate with end users and/or the wireless network and allow them to benefit from the functionality described herein.

Auxiliary equipment 634 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. wireless device 610 may further comprise power circuitry 637 for delivering power from power source 636 to the various parts of wireless device 610 which need power from power source 636 to carry out any functionality described or indicated herein. Power circuitry 637 may in certain embodiments comprise power management circuitry. Power circuitry 637 may additionally or alternatively be operable to receive power from an external power source; in which case wireless device 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of wireless device 610 to which power is supplied.

Figure 10:
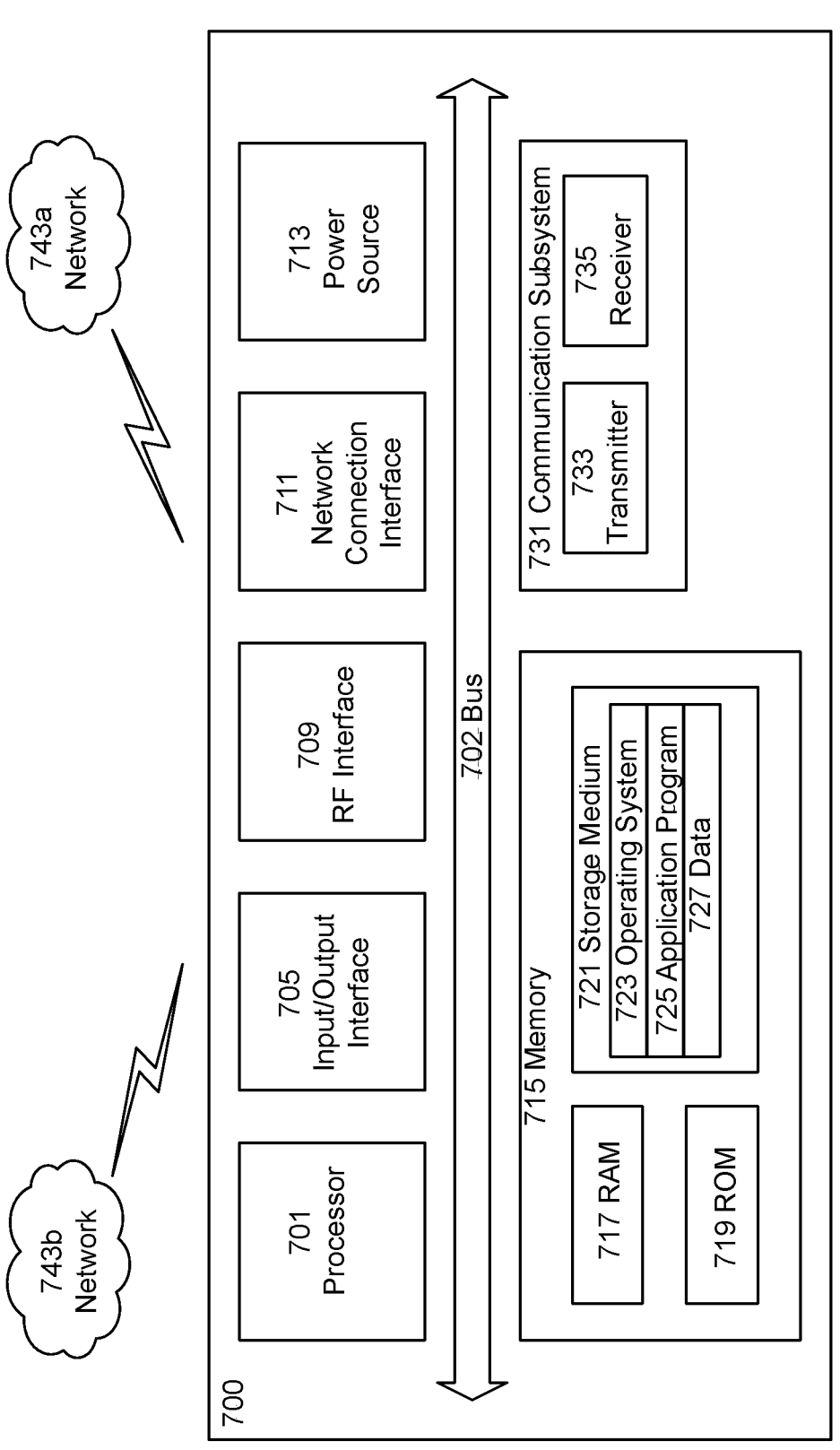
FIG. 10 illustrate an example user equipment, according to certain embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the 3$^{rd}$ Generation Partnership Project (3GPP), including a NB-IoT UE, a machine type communication (MTC) UE, and/or an enhanced MTC (eMTC) UE. UE 700, as illustrated in FIG. 8, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 10, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another wireless device, UE, or base station of a radio access network (RAN) according to one or more communication protocols, such as IEEE 802.7, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 11:
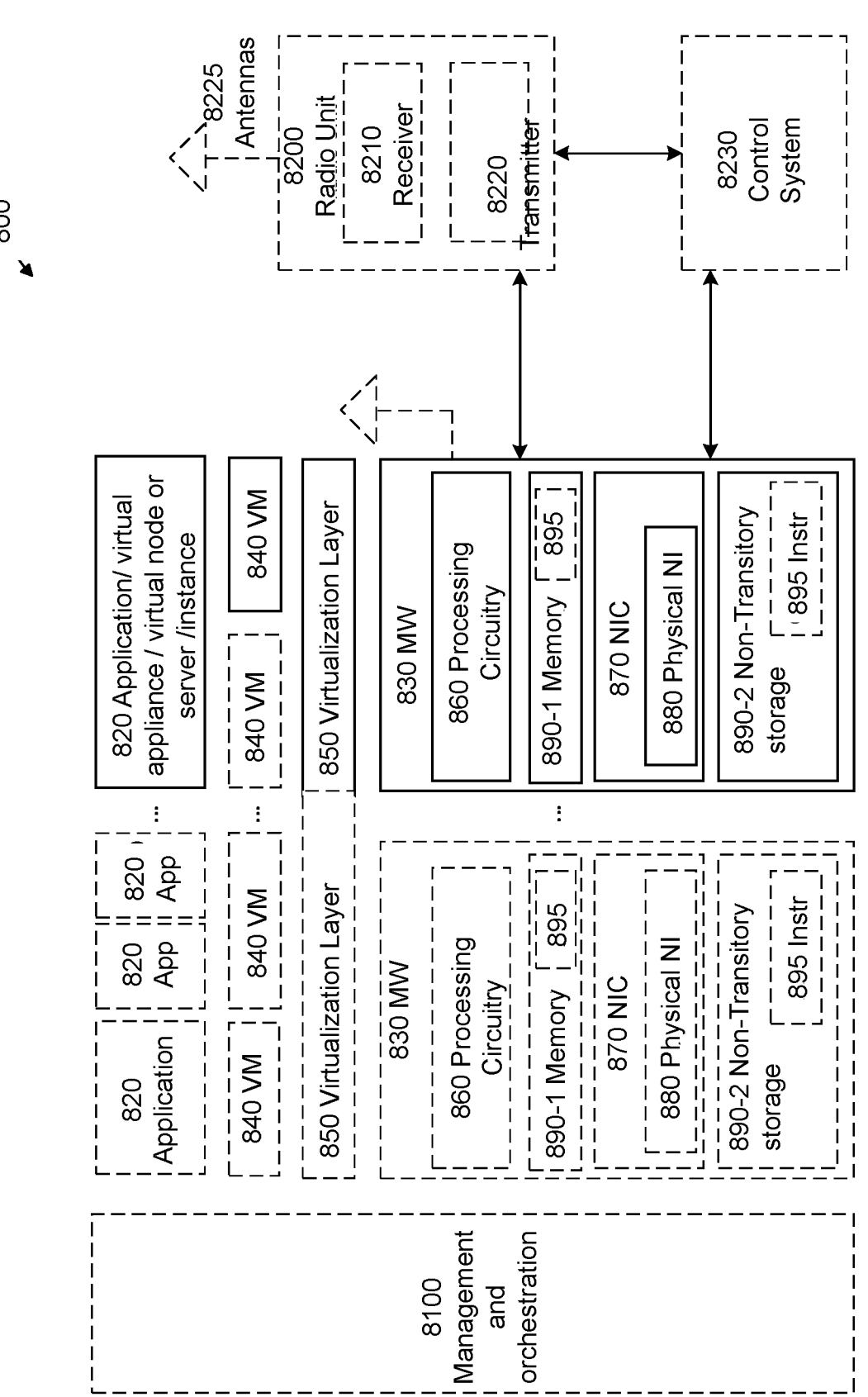
FIG. 11 illustrates a virtualization environment in which functions implemented by some embodiments may be virtualized, according to certain embodiments.

FIG. 11 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 11, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 11.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signaling can be affected with the use of control system 8230 which may alternatively be used for communication between the hardware nodes 830 and radio units 8200.

Figure 12:
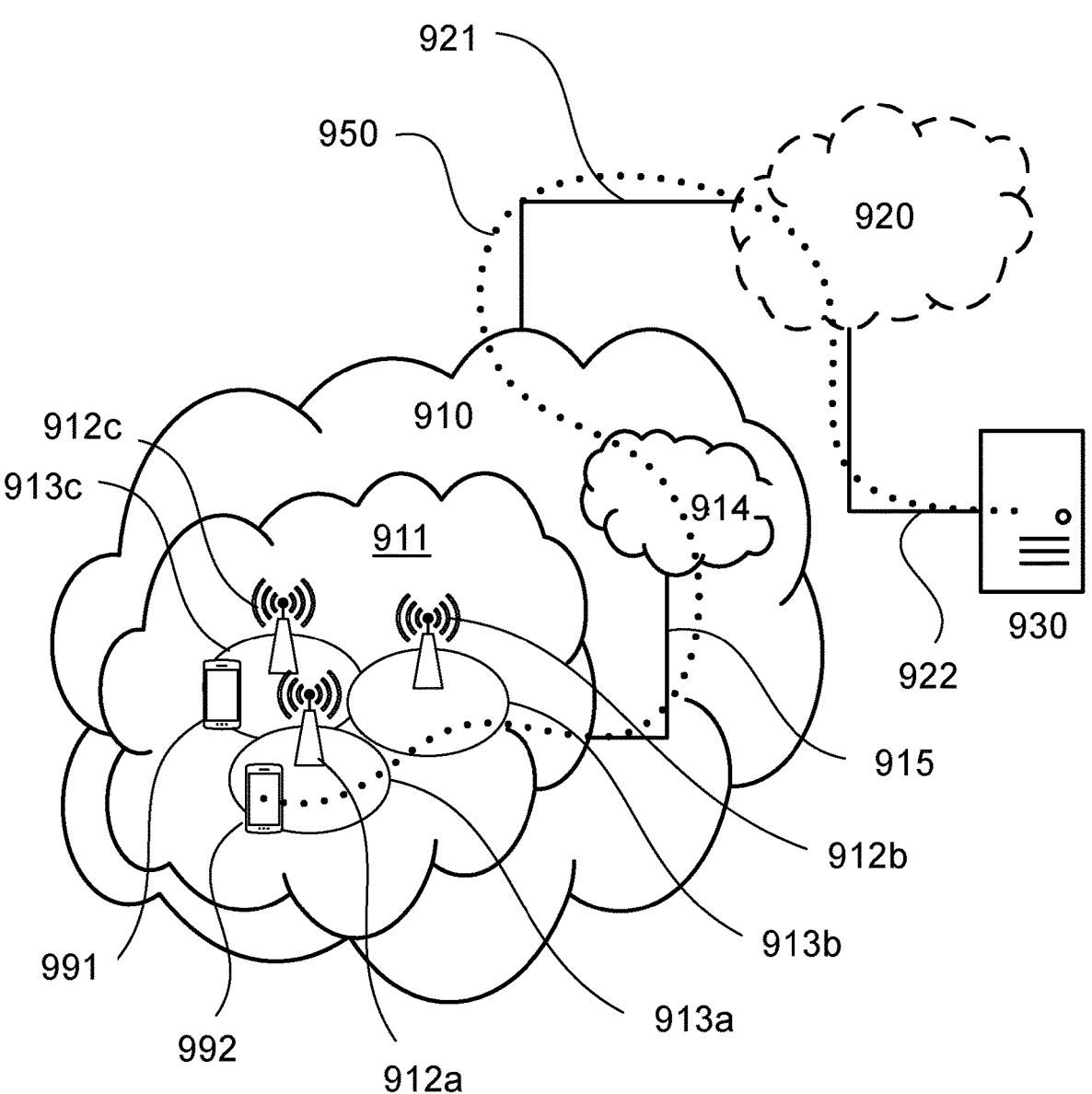
FIG. 12 illustrates a telecommunication network connected via an intermediate network to a host computer, according to certain embodiments.

FIG. 12 illustrates a telecommunication network connected via an intermediate network to a host computer in accordance with some embodiments.

With reference to FIG. 12, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 12 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station

912 need not be aware of the future routing of an outgoing uplink communication originating from the UE 991 towards the host computer 930.

Figure 13:
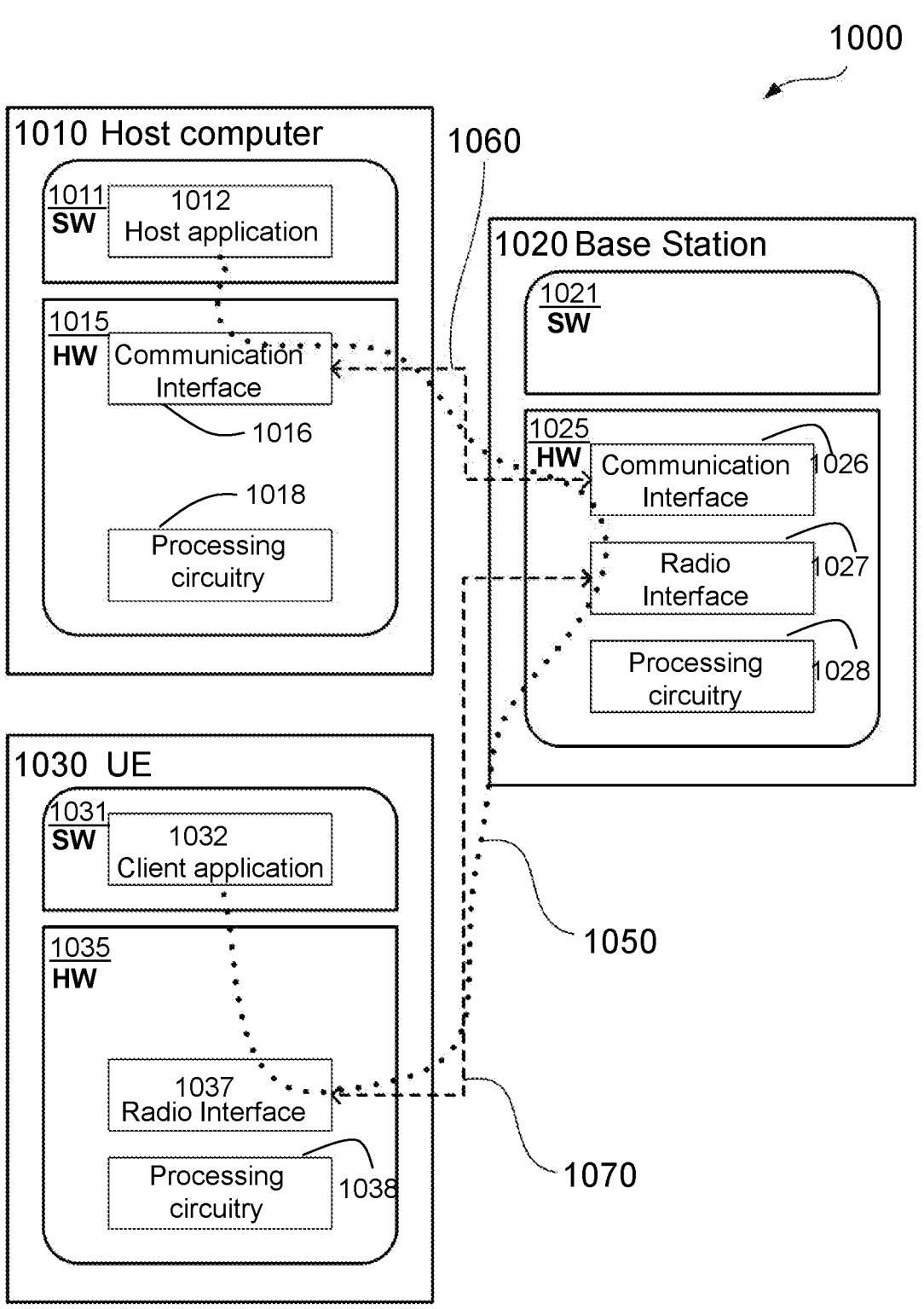
FIG. 13 illustrates a generalized block diagram of a host computer communicating via a base station with a user equipment over a partially wireless connection, according to certain embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 13) served by base station 1020. Communication interface 1026 may be configured to facilitate connection 1060 to host computer 1010. Connection 1060 may be direct or it may pass through a core network (not shown in FIG. 13) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 13 may be similar or identical to host computer 930, one of base stations 912a, 912b, 912c and one of UEs 991, 992 of FIG. 12, respectively. This is to say, the inner workings of these entities may be as shown in FIG. 13 and independently, the surrounding network topology may be that of FIG. 12.

In FIG. 13, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figures 14, 15:
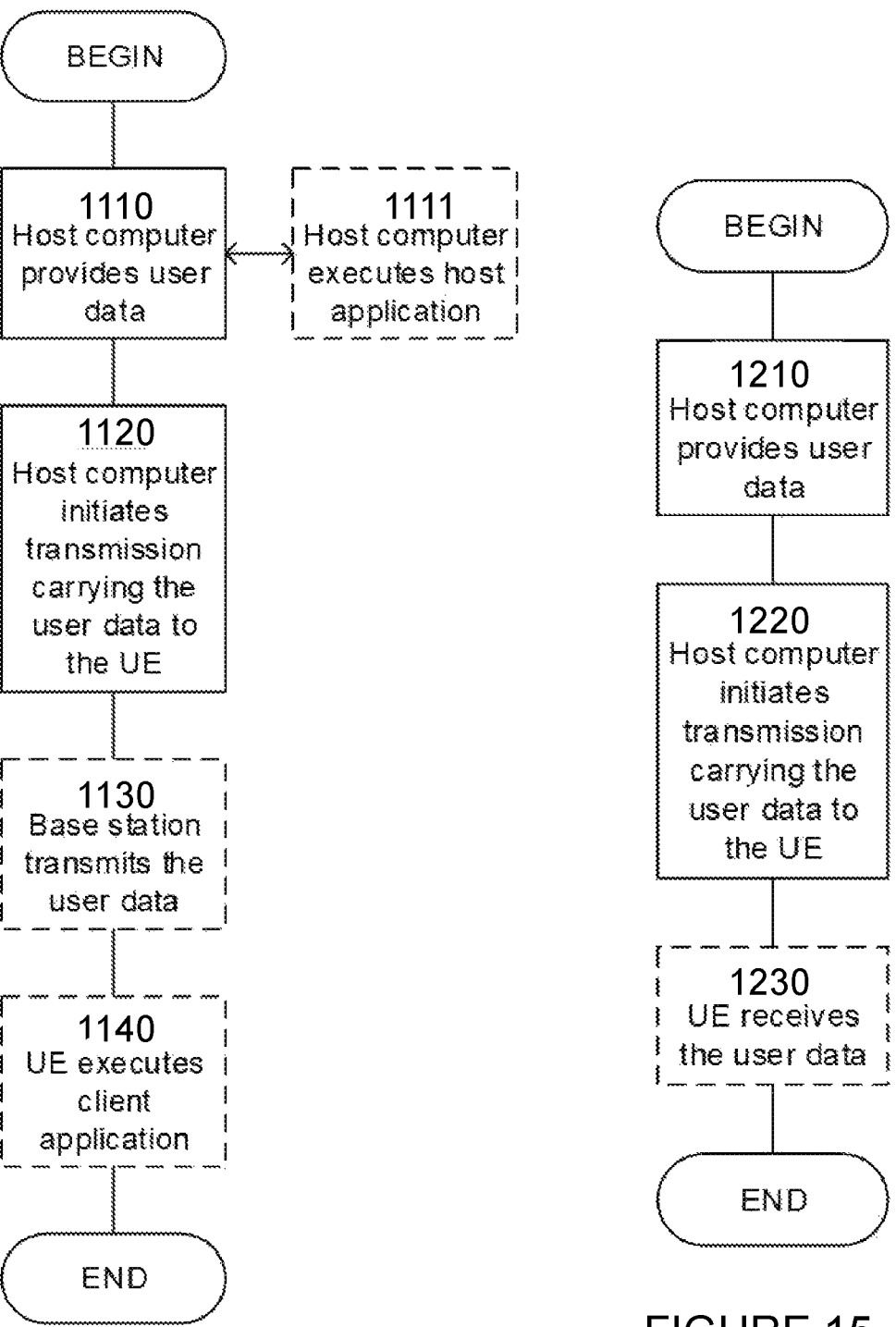
FIG. 14 illustrates a method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figures 16, 17:
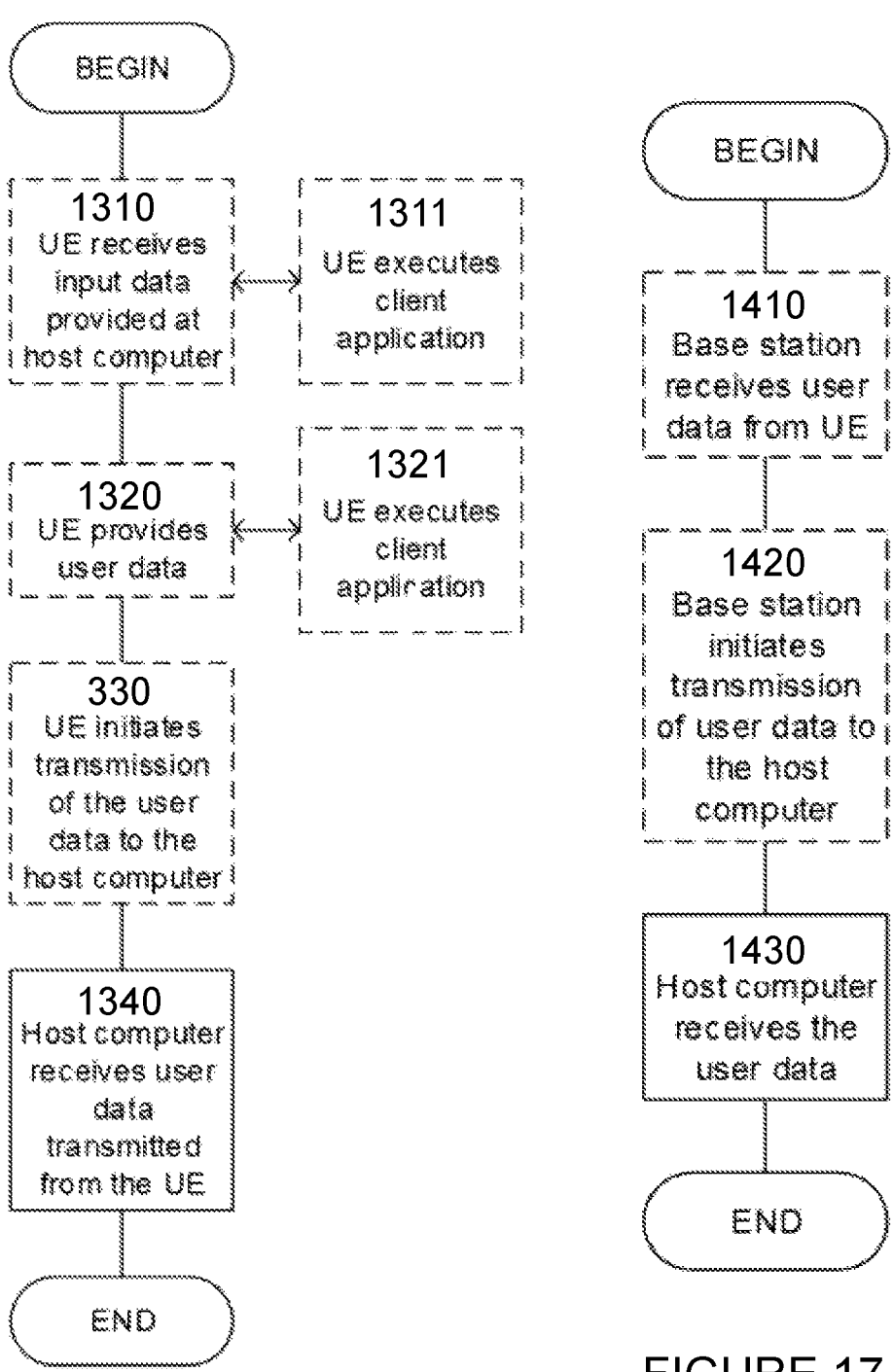
FIG. 16 illustrates another method implemented in a communication system, according to one embodiment.
FIG. 17 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figures 18, 19:
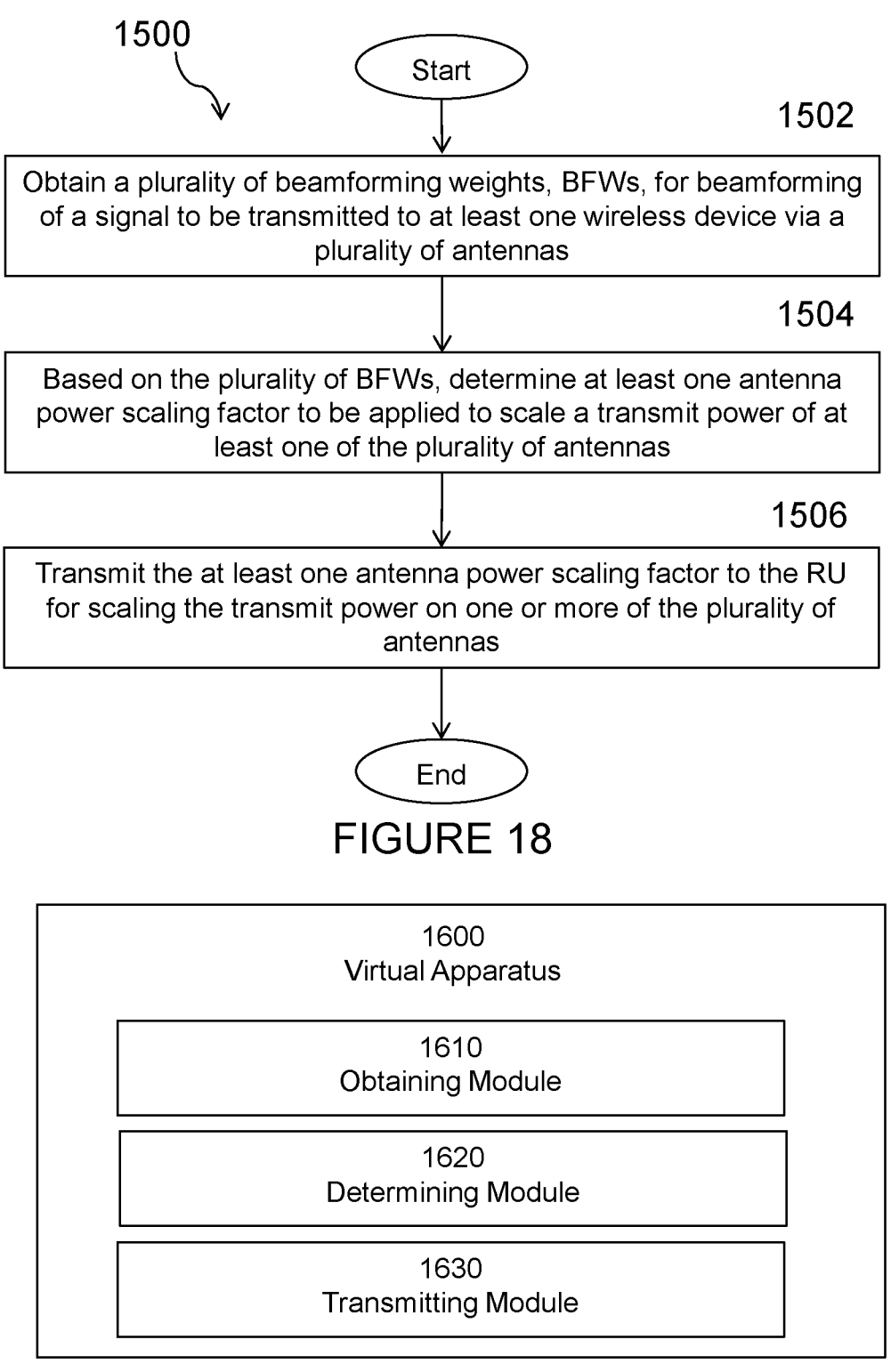
FIG. 18 illustrates depicts an example method by a BBU for antenna power scaling in a fronthaul LLS, according to certain embodiments.
FIG. 19 illustrates an example virtual apparatus, according to certain embodiments.

FIG. 18 depicts a method 1500 for antenna power scaling in a fronthaul LLS, according to certain embodiments. The method is performed by a BBU for assisting a RU in scaling an antenna transmit power when performing beamforming. The method begins at step 1502, when the BBU obtains a plurality of BFWs for beamforming of a signal to be transmitted to at least one wireless device via a plurality of antennas. Based on the plurality of BFWs, the BBU determines at least one antenna power scaling factor to be applied to scale a transmit power of at least one of the plurality of antennas, at step 1504. At step 1506, the BBU transmits the at least one antenna power scaling factor to the RU for scaling the transmit power on one or more of the plurality of antennas.

In a particular embodiment, obtaining the plurality of BFWs includes calculating the plurality of BFWs based on at least one channel estimation of at least one downlink channel between the RU and the at least one wireless device.

In a particular embodiment, the at least one channel estimation is performed based on at least one SRS or at least one DMRS.

In a particular embodiment, the BBU normalizes the plurality of BFWs based on at least one power scaling criteria. In a further particular embodiment, the at least one power scaling criteria is based on a power of a first BFW that has a highest power value and/or a total power of the plurality of BFWs.

In a particular embodiment, the plurality of BFWs are associated with a subset of subcarriers within a plurality of scheduled subcarriers.

In a particular embodiment, the BBU transmits the plurality of BFWs to the RU, and all of the plurality of BFWs are obtained and/or transmitted to the RU before the at least one antenna power scaling factor is determined.

In a particular embodiment, the BBU compresses the plurality of BFWs prior to transmitting the plurality of BFWs to the RU.

In a further particular embodiment, the plurality of BFWs are transmitted to the RU with control information for performing beamforming. In a further particular embodiment, the control information comprises scheduling information.

In a particular embodiment, the BBU transmits, to the RU, a number of user-layer data streams for transmission to the at least one wireless device. The number of user-layer data streams are to be transmitted via the plurality of antennas that are scaled based on the at least one antenna power scaling factor.

In a particular embodiment, the at least one antenna power scaling factor comprises at least a first antenna power scaling factor to be applied to scale the transmit power of the plurality of antennas.

In a particular embodiment, the at least one antenna power scaling factor comprises a plurality of antenna power scaling factors, and each of the plurality of antenna power scaling factors is to be applied to scale a transmit power of an associated one of the plurality of antennas.

In a particular embodiment, the at least one antenna power scaling factor is determined based on a power contribution of all BFWs on all scheduled subcarriers.

In a particular embodiment, each of the at least one antenna power scaling factors are determined after all of the plurality of BFWs are obtained for all scheduled subcarriers.

In a particular embodiment, the at least one antenna power scaling factor is transmitted via a control-plane message.

In a particular embodiment, after determining and transmitting the at least one antenna power scaling factor to the RU, the BBU obtains at least one updated BFW.

Based on at least the updated BFW, the BBU determines at least one updated antenna power scaling factor and transmits the at least one updated antenna power scaling factor to the RU.

In a particular embodiment, the at least one updated BFW is obtained every OFDM symbol.

In a particular embodiment, the BBU and the RU are associated with a distributed base station system.

In various particular embodiments, the method may additionally or alternatively include one or more of the steps or features of the Group A and Group C Example Embodiments described below.

FIG. 19 illustrates a schematic block diagram of a virtual apparatus 1600 in a wireless network (for example, the wireless network shown in FIG. 7). The apparatus may be implemented in a wireless device or network node (e.g., wireless device 610 or network node 660 shown in FIG. 7). Apparatus 1600 is operable to carry out the example method described with reference to FIG. 18 and possibly any other processes or methods disclosed herein. It is also to be understood that the method of FIG. 18 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1610, determining module 1620, transmitting module 1630, and any other suitable units of apparatus 1600 to perform corresponding functions according one or more embodiments of the present disclosure.

According to certain embodiments, obtaining module 1610 may perform certain of the obtaining functions of the apparatus 1600. For example, obtaining module 1610 may obtain a plurality of BFWs for beamforming of a signal to be transmitted to at least one wireless device via a plurality of antennas.

According to certain embodiments, determining module 1620 may perform certain of the determining functions of the apparatus 1600. For example, based on the plurality of BFWs, determining module 1620 may determine at least one antenna power scaling factor to be applied to scale a transmit power of at least one of the plurality of antennas.

According to certain embodiments, transmitting module 1630 may perform certain of the transmitting functions of the apparatus 1600. For example, transmitting module 1630 may transmit the at least one antenna power scaling factor to the RU for scaling the transmit power on one or more of the plurality of antennas.

Optionally, in particular embodiments, virtual apparatus may additionally include one or more modules for performing any of the steps or providing any of the features in the Group A and Group C Example Embodiments described below.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
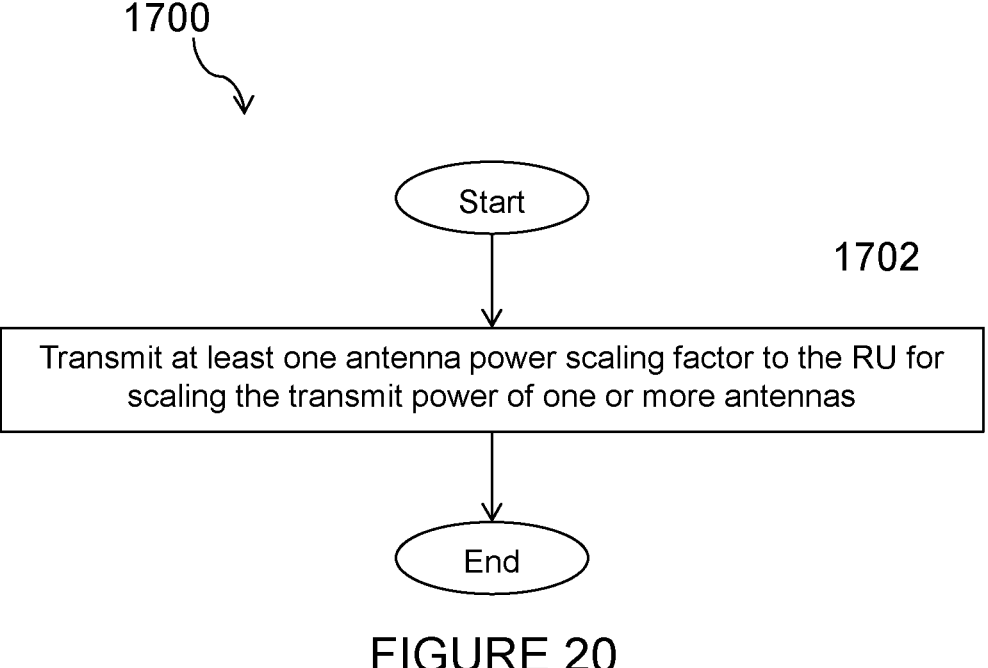
FIG. 20 illustrates depicts another example method by a BBU for antenna power scaling in a FH LLS, according to certain embodiments, according to certain embodiments.

FIG. 20 depicts a method 1700 for antenna power scaling in a FH LLS, according to certain embodiments. The method is performed by a BBU (which may also be referred to as an O-DU) for assisting a RU (which may also be termed an O-RU) in scaling a transmit power of one or more antennas when performing beamforming. The method begins at step 1702, when the BBU transmits at least one power scaling factor to the RU for scaling the transmit power of the one or more antennas.

In a particular embodiment, the BBU obtains a plurality of BFWs for beamforming of a signal to be transmitted to at least one wireless device via the one or more antennas. Based on the plurality of BFWs, the BBU determines the at least one antenna power scaling factor to be applied to scale the transmit power of at least one of the antennas.

In a particular embodiment, the at least one antenna power scaling factor is determined after all of the plurality of BFWs are obtained.

In a particular embodiment, the BBU transmits at least one BFW of the plurality of BFWs before the at least one antenna power scaling factor is determined.

In a particular embodiment, the at least one antenna power scaling factor is transmitted with at least one additional scaling factor that is not determined based on the plurality of BFWs.

For example, there exists a possibility in some cases that the scaling factors determined by the BBU (as being based on the BFWs) are included in or otherwise combined with other existing scaling factors that are used for other purposes. In O-RAN, for example, there is a feature called modulation compression, which has also scaling factors to scale the IQ data back to the constellation points. Thus, in a particular embodiment, the BBU may include the scaling factors determined based on the BFWs in these other scaling factors.

In a particular embodiment, the BBU normalizes the plurality of BFWs based on at least one power scaling criteria. Specifically, in one example, the BBU may use the at least one power scaling factor to limit the transmit power of one or more of the antennas below a threshold.

In a particular embodiment, the at least one antenna power scaling factor is determined based on a power contribution of all BFWs on all scheduled resource elements.

In a particular embodiment, each antenna power scaling factor is determined after the plurality of BFWs are obtained for all scheduled resource elements.

In certain embodiments, the antenna power scaling factor(s) may not be applied to all subcarriers of each symbol, i.e. all resource elements (RE) of each symbol. Thus, some reference signals may maintain their original power and, therefore, should not be scaled. Examples of these reference signals may include, in particular embodiments, CSI-RS, Tracking Reference Signal (TRS), Primary Synchronization Signal (PSS), and Secondary Synchronization Signal (SSS). These reference signals or synchronization signals usually use predefined beams whose beam weights have unit power. Thus, in certain embodiments, the antenna power scaling factors may consider the power contributions of both groups of subcarriers, those to be scaled and those to be unscaled. However, the antenna power scaling factors may be used to scale only the subcarriers that are to be scaled. Effectively, the outcome may be to scale the power of the scaled subcarriers to the targeted or max power minus the power of unscaled subcarriers.

In a particular embodiment, the scaling factors are associated with one carrier of a plurality of carriers transmitted on the one or more antennas.

In a particular embodiment, the at least one antenna power scaling factor includes at least a first antenna power scaling factor to be applied to scale the transmit power of a plurality of antennas.

In a particular embodiment, the at least one antenna power scaling factor includes a plurality of antenna power scaling factors, and each of the plurality of antenna power scaling factors is to be applied to scale the transmit power of an associated one of a plurality of antennas.

In a particular embodiment, the at least one antenna power scaling factor is transmitted via a control-plane message.

In a particular embodiment, after determining and transmitting the at least one antenna power scaling factor to the RU, the BBU obtains at least one updated BFW.

Based on at least the updated BFW, the BBU determines at least one updated antenna power scaling factor and transmits the at least one updated antenna power scaling factor to the RU.

In a particular embodiment, the BBU and the RU are associated with a distributed base station system.

Figure 21:
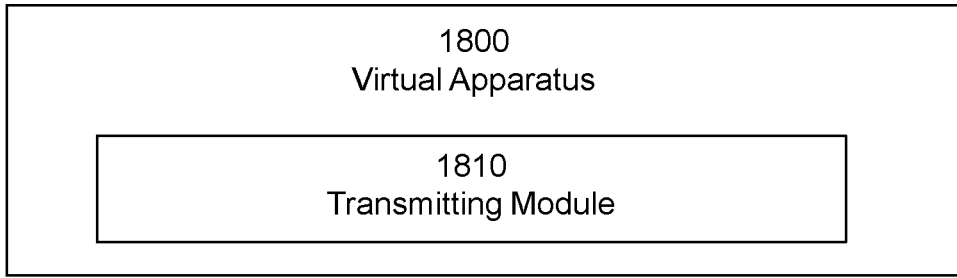
FIG. 21 illustrates another example virtual apparatus, according to certain embodiments.

FIG. 21 illustrates a schematic block diagram of a virtual apparatus 1800 in a wireless network (for example, the wireless network shown in FIG. 7). The apparatus may be implemented in a wireless device or network node (e.g., wireless device 610 or network node 660 shown in FIG. 7). Apparatus 1800 is operable to carry out the example method described with reference to FIG. 20 and possibly any other processes or methods disclosed herein. It is also to be understood that the method of FIG. 20 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1810 and any other suitable units of apparatus 1800 to perform corresponding functions according one or more embodiments of the present disclosure.

According to certain embodiments, transmitting module 180 may perform certain of the transmitting functions of the apparatus 1800. For example, transmitting module 1810 may transmit at least one power scaling factor to the RU for scaling the transmit power of the one or more antennas.

Figure 22:
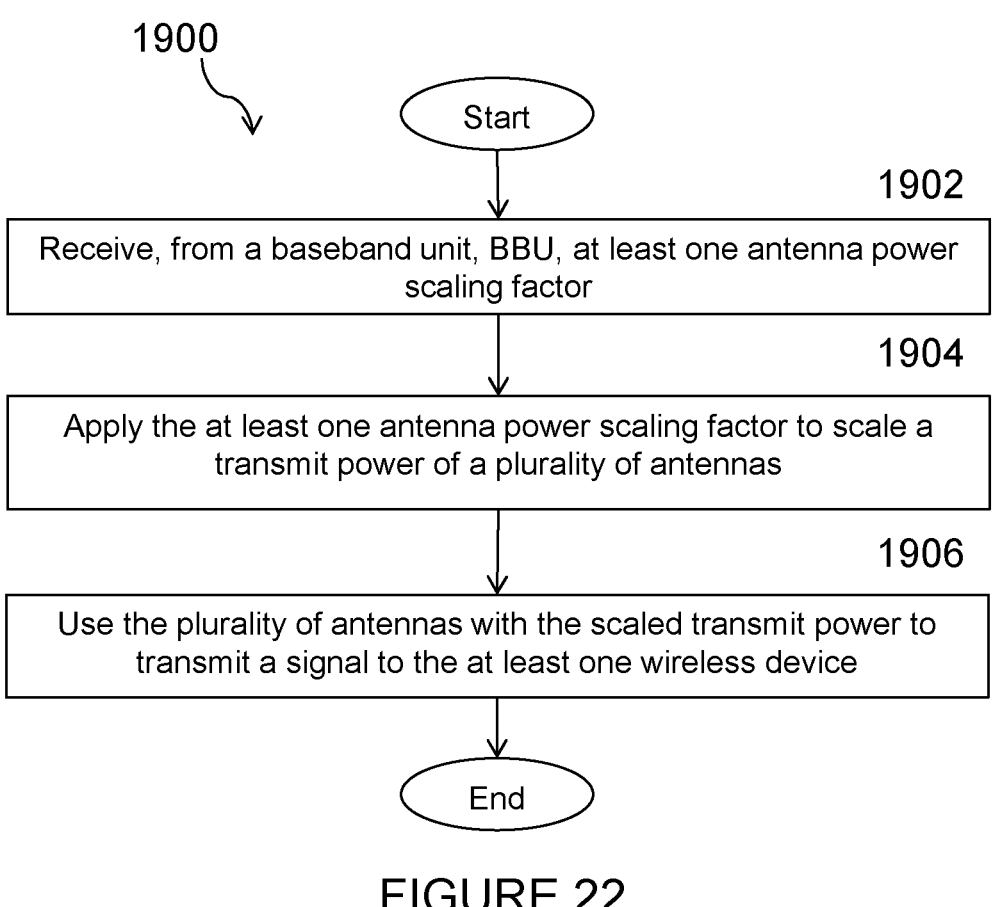
FIG. 22 illustrates an example method performed by a RU for performing beamforming for a communication between the RU and at least one wireless device, according to certain embodiments.

FIG. 22 depicts a method 1900 performed by a RU for performing beamforming for a communication between the RU and at least one wireless device, according to certain embodiments. The method begins at step 1902 when the RU receives, from a BBU, at least one antenna power scaling factor. At step 1904, the RU applies the at least one antenna power scaling factor to scale a transmit power of a plurality of antennas. At step 1906, the RU uses the plurality of antennas with the scaled transmit power to transmit a signal to the at least one wireless device.

In a particular embodiment, the RU receives, from the BBU, a plurality of BFWs associated with at least one subcarrier. The at least one antenna power scaling factor is based on the plurality of BFWs.

In a particular embodiment, the plurality of BFWs are associated with a subset of subcarriers within a plurality of scheduled subcarriers.

In a particular embodiment, the plurality of BFWs received from the BBU do not include a BFW for at least one scheduled subcarrier. Based on the plurality of BFWs received from the BBU, the RU obtains at least one additional BFW for at least one scheduled subcarrier for which a BFW was not received from the BBU.

In a further particular embodiment, obtaining the at least one additional BFW for the at least one scheduled subcarrier for which the BFW was not received from the BBU includes at least one of: repeating at least one of the plurality of BFWs that is a neighbor to the at least one scheduled subcarrier for the at least one scheduled subcarrier for which a BFW was not received; and interpolating the plurality of BFWs that were received from the BBU for the at least one scheduled subcarrier for which a BFW was not received.

In a further particular embodiment, the plurality of BFWs are received from the BBU before the the at least one antenna power scaling factor is received from the BBU.

In a further particular embodiment, the plurality of BFWs are compressed when received from the BBU, and the RU decompresses and/or reconstructs the plurality of BFWs.

In a further particular embodiment, the plurality of BFWs are received with control information for performing beamforming. In still a further particular embodiment, the control information comprises scheduling information.

In a particular embodiment, the signal transmitted to the at least one wireless device comprises a number of user-layer downlink data streams, and the RU receives the number of user-layer downlink data streams from the BBU.

In a further particular embodiment, each one of the number of user-layer downlink data streams is transmitted to an associated one of a plurality of wireless devices.

In a particular embodiment, the RU transmits, to the BBU, information associated with a reference signal transmitted on at least one downlink channel between the RU and the at least one wireless device. The information is for channel estimation of the at least one downlink channel by the BBU. In a further particular embodiment, the reference signal comprises a SRS or a DMRS.

In a particular embodiment, applying the at least one antenna power scaling factor to scale the transmit power of the plurality of antennas includes applying a single antenna power scaling factor to scale the transmit power of at least two of the plurality of antennas.

In a particular embodiment, applying the at least one antenna power scaling factor to scale the transmit power of the plurality of antennas includes applying a single antenna power scaling factor to scale the transmit power of each of the plurality of antennas.

In a particular embodiment, applying the at least one antenna power scaling factor to scale the transmit power of the plurality of antennas includes applying each one of a plurality of antenna power scaling factors to scale an associated one of the plurality of antennas.

In a particular embodiment, applying the at least one antenna power scaling factor to scale the transmit power of the plurality of antennas comprises applying the at least one antenna power scaling factor to the plurality of BFWs received from the BBU on IQ samples of all scheduled subcarriers.

In a particular embodiment, applying the at least one antenna power scaling factor to scale the transmit power of the plurality of antennas comprises applying the at least one antenna power scaling factor to a plurality of frequency-domain IQ samples of the signal before the signal is multiple with the BFWs associated with each antenna.

In a particular embodiment, applying the at least one antenna power scaling factor to scale the transmit power of the plurality of antennas comprises applying the at least one antenna power scaling factor to a plurality of time-domain IQ samples of the signal for each of the plurality of antennas.

In a particular embodiment, the at least one antenna power scaling factor is determined based on a power contribution of all of the plurality of BFWs on all scheduled subcarriers.

In a particular embodiment, the at least one antenna power scaling factor is received as a control-plane message.

In a particular embodiment, after receiving the at least one antenna power scaling factor from the BBU, the RU receives at least one updated BFW from the BBU. After receiving the at least one updated BFW from the BBU, the RU receives at least one updated antenna power scaling factor to be applied to scale the transmit power of at least one of the plurality of antennas. The RU uses the at least one antenna with the scaled transmit power based on the updated antenna power scaling factor to transmit at least one additional signal to the at least one wireless device.

In a further particular embodiment, the at least one updated BFW is received every Orthogonal Frequency Division Multiplexing, OFDM, symbol.

In a particular embodiment, the BBU and the RU are associated with a distributed base station system.

In various particular embodiments, the method may include one or more of any of the steps or features of the Group B and Group C Example Embodiments described below.

Figure 23:
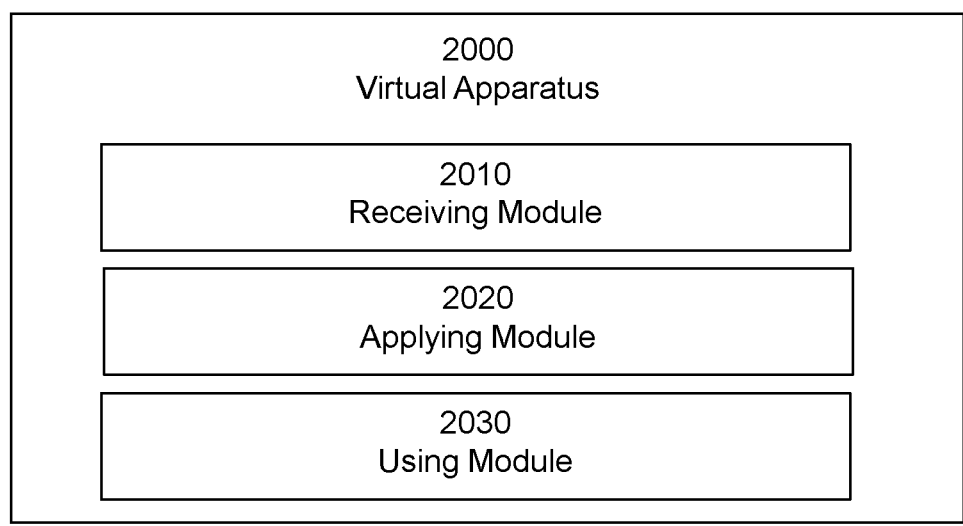
FIG. 23 illustrates another example virtual apparatus, according to certain embodiments.

FIG. 23 illustrates a schematic block diagram of a virtual apparatus 2000 in a wireless network (for example, the wireless network shown in FIG. 7). The apparatus may be implemented in a wireless device or network node (e.g., wireless device 610 or network node 660 shown in FIG. 7). Apparatus 2000 is operable to carry out the example method described with reference to FIG. 22 and possibly any other processes or methods disclosed herein. It is also to be understood that the method of FIG. 22 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 2010, applying module 2020, using module 2030, and any other suitable units of apparatus 2000 to perform corresponding functions according one or more embodiments of the present disclosure.

According to certain embodiments, receiving module 2010 may perform certain of the receiving functions of the apparatus 2000. For example, receiving module 2010 may receive, from a BBU, at least one antenna power scaling factor.

According to certain embodiments, applying module 2020 may perform certain of the applying functions of the apparatus 2000. For example, applying module 2020 may apply the at least one antenna power scaling factor to scale a transmit power of a plurality of antennas.

According to certain embodiments, using module 2030 may perform certain of the using functions of the apparatus 2000. For example, using module 2030 may use the plurality of antennas with the scaled transmit power to transmit a signal to the at least one wireless device.

Optionally, in particular embodiments, virtual apparatus may additionally include one or more modules for performing any of the steps or providing any of the features in the Group B and Group C Example Embodiments described below.

Figure 24:
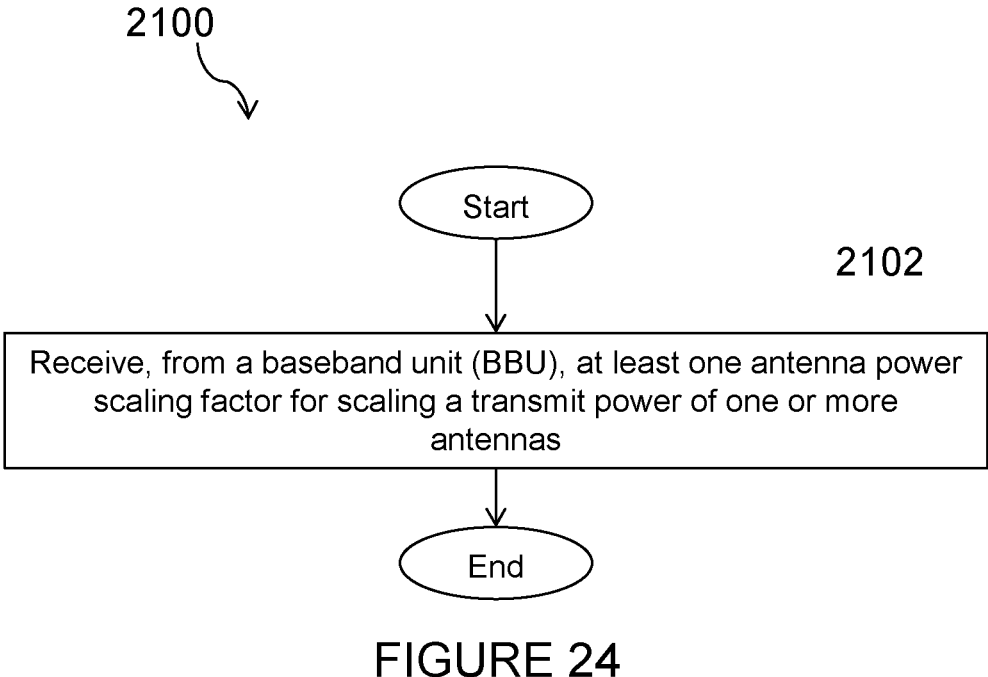
FIG. 24 illustrates another example method performed by a RU for performing beamforming for a communication between the RU and at least one wireless device, according to certain embodiments.

FIG. 24 depicts a method 2100 performed by a RU comprising one or more antennas for performing beamforming for a communication between the RU and at least one wireless device, according to certain embodiments. The method begins at step 2102 when the RU receives, from a BBU, at least one antenna power scaling factor for scaling a transmit power of the one or more antennas.

In a particular embodiment, the RU applies the at least one antenna power scaling factor to scale the transmit power of the one or more antennas and uses the one or more antennas with the scaled transmit power to transmit a signal to the at least one wireless device.

In a particular embodiment, when applying the at least one antenna power scaling factor to scale the antenna transmit power of the one or more antennas, the RU applies a single antenna power scaling factor to scale the antenna transmit power of each of a plurality of antennas.

In a particular embodiment, when applying the at least one antenna power scaling factor to scale the antenna transmit power of the one or more antennas, the RU applies each one of a plurality of antenna power scaling factors to scale an associated one of a plurality of antennas.

In a particular embodiment, when applying the at least one antenna power scaling factor to scale the antenna transmit power of the one or more antennas, the RU applies the at least one antenna power scaling factor to a plurality of BFWs received from the BBU on IQ data of one or more scheduled resource elements.

In a particular embodiment, when applying the at least one antenna power scaling factor to scale the antenna transmit power of the one or more antennas, the RU applies the at least one antenna power scaling factor to a plurality of frequency-domain IQ data of the signal before the signal is multiplied with the BFWs associated with each antenna.

In a particular embodiment, when applying the at least one antenna power scaling factor to scale the antenna transmit power of the one or more antennas, the RU applies the at least one antenna power scaling factor to a plurality of frequency-domain IQ data of the signal after the signal is multiplied with the BFWs associated with each antenna.

In a particular embodiment, when applying the at least one antenna power scaling factor to scale the antenna transmit power of the one or more antennas, the RU applies the at least one antenna power scaling factor to a plurality of time-domain IQ data of the signal for each of a plurality of antennas.

In a particular embodiment, the RU receives, from the BBU, a plurality of BFWs associated with at least one subcarrier, and the at least one antenna power scaling factor is based on the plurality of BFWs.

In a particular embodiment, the scaling factors are associated with a carrier.

In a particular embodiment, the plurality of BFWs received from the BBU do not include a BFW for at least one scheduled subcarrier, and based on the plurality of BFWs received from the BBU, the RU obtains at least one additional BFW for at least one scheduled subcarrier for which a BFW was not received from the BBU.

In a further particular embodiment, obtaining the at least one additional BFW for the at least one scheduled subcarrier for which the BFW was not received from the BBU comprises at least one of: repeating at least one of the plurality of BFWs for the at least one scheduled subcarrier for which a BFW was not received; and interpolating the plurality of BFWs that were received from the BBU for the at least one scheduled subcarrier for which a BFW was not received.

In a particular embodiment, at least one BFW is received from the BBU before the at least one antenna power scaling factor is received from the BBU.

In a particular embodiment, the at least one antenna power scaling factor is determined based on a power contribution of the plurality of BFWs on all scheduled subcarriers to be scaled and not scaled.

In certain embodiments, however, the antenna power scaling factor(s) may not be applied to all subcarriers of each symbol, i.e. all resource elements (RE) of each symbol. Thus, some reference signals may maintain their original power and, therefore, should not be scaled. Examples of these reference signals may include, in particular embodiments, CSI-RS, TRS, PSS, and SSS. These reference signals usually use predefined beams whose beam weights has unit power. Thus, in certain embodiments, the antenna power scaling factors may consider the power contributions of both groups of subcarriers, those to be scaled and those to be unscaled. However, the antenna power scaling factors may be used to scale only the subcarriers that are to be scaled. Effectively, the outcome may be to scale the power of the scaled subcarriers to the targeted or max power minus the power of unscaled subcarriers.

In a particular embodiment, after receiving the at least one antenna power scaling factor from the BBU, the RU receives at least one updated BFW from the BBU. After receiving the at least one updated BFW from the BBU, the RU receives at least one updated antenna power scaling factor to be applied to scale the transmit power of at least one antenna. The RU uses the at least one antenna with the scaled transmit power based on the updated antenna power scaling factor to transmit at least one additional signal to the at least one wireless device. Note that the at least one additional signal to the at least one wireless device denotes the signal corresponding to another OFDM symbol.

Figure 25:
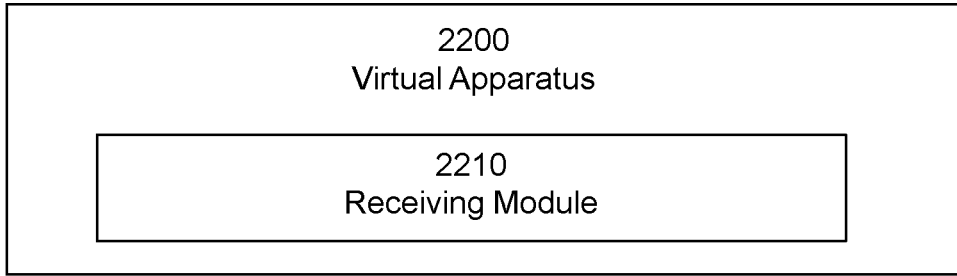
FIG. 25 illustrates another example virtual apparatus, according to certain embodiments.

FIG. 25 illustrates a schematic block diagram of a virtual apparatus 2200 in a wireless network (for example, the wireless network shown in FIG. 7). The apparatus may be implemented in a wireless device or network node (e.g., wireless device 610 or network node 660 shown in FIG. 7). Apparatus 2200 is operable to carry out the example method described with reference to FIG. 24 and possibly any other processes or methods disclosed herein. It is also to be understood that the method of FIG. 24 is not necessarily carried out solely by apparatus 2200. At least some operations of the method can be performed by one or more other entities.

Virtual Apparatus 2200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 2210 and any other suitable units of apparatus 2200 to perform corresponding functions according one or more embodiments of the present disclosure.

According to certain embodiments, receiving module 2210 may perform certain of the receiving functions of the apparatus 2200. For example, receiving module 2210 may receive, from a BBU, at least one antenna power scaling factor for scaling a transmit power of the one or more antennas.

EXAMPLE EMBODIMENTS

Group A Example Embodiments

Example Embodiment A1. A method for antenna power scaling in a fronthaul lower-layer split, LLS, the method performed by a baseband unit, BBU, for assisting a Radio Unit, RU, in scaling an antenna transmit power when performing beamforming, the method comprising: obtaining a plurality of beamforming weights, BFWs, for beamforming of a signal to be transmitted to at least one wireless device via a plurality of antennas; based on the plurality of BFWs, determining at least one antenna power scaling factor to be applied to scale a transmit power of at least one of the plurality of antennas; and transmitting the at least one antenna power scaling factor to the RU for scaling the transmit power on one or more of the plurality of antennas.

Example Embodiment A2. The method of Example Embodiment A1, wherein obtaining the plurality of BFWs comprises calculating the plurality of BFWs based on at least one channel estimation of at least one downlink channel between the RU and the at least one wireless device.

Example Embodiment A3. The method of Example Embodiment A2, wherein the at least one channel estimation is performed based on at least one sounding reference signal, SRS, or at least one demodulation reference signal, DMRS.

Example Embodiment A4. The method of any one of Example Embodiments A1 to A3, further comprising normalizing the plurality of BFWs based on at least one power scaling criteria.

Example Embodiment A5. The method of Example Embodiment A4, wherein the at least one power scaling criteria is based on a power of a first BFW that has a highest power value and/or a total power of the plurality of BFWs.

Example Embodiment A6. The method of any one of Example Embodiments A1 to A5, wherein the plurality of BFWs are associated with a subset of subcarriers within a plurality of scheduled subcarriers.

Example Embodiment A7. The method of any one of Example Embodiments A1 to A6, further comprising: transmitting the plurality of BFWs to the RU, and wherein all of the plurality of BFWs are obtained by the BBU and/or transmitted to the RU before the at least one antenna power scaling factor is determined.

Example Embodiment A8. The method of Embodiment A7, further comprising compressing the plurality of BFWs prior to transmitting the plurality of BFWs to the RU.

Example Embodiment A9. The method of any one of Example Embodiments A7 to A8, wherein the plurality of BFWs are transmitted to the RU with control information for performing beamforming.

Example Embodiment A10. The method of Example Embodiment A9, wherein the control information comprises scheduling information.

Example Embodiment A11. The method of any one of Example Embodiments A1 to A10, further comprising transmitting, to the RU, a number of user-layer data streams for transmission to the at least one wireless device, wherein the number of user-layer data streams are to be transmitted via the plurality of antennas that are scaled based on the at least one antenna power scaling factor.

Example Embodiment A12. The method of any one of Example Embodiments A1 to A11, wherein the at least one antenna power scaling factor comprises at least a first antenna power scaling factor to be applied to scale the transmit power of the plurality of antennas.

Example Embodiment A13. The method of any one of Example Embodiments A1 to A11, wherein the at least one antenna power scaling factor comprises a plurality of antenna power scaling factors, and wherein each of the plurality of antenna power scaling factors is to be applied to scale a transmit power of an associated one of the plurality of antennas.

Example Embodiment A14. The method of any one of Example Embodiments A1 to A13, wherein the at least one antenna power scaling factor is determined based on a power contribution of all BFWs on all scheduled subcarriers.

Example Embodiment A15. The method of any one of Example Embodiments A1 to A14, wherein each of the at least one antenna power scaling factors are determined after all of the plurality of BFWs are obtained for all scheduled subcarriers.

Example Embodiment A16. The method of any one of Example Embodiments A1 to A15, wherein the at least one antenna power scaling factor is transmitted via a control-plane message.

Example Embodiment A17. The method of any one of Example Embodiments A1 to A16, further comprising: after determining and transmitting the at least one antenna power scaling factor to the RU, obtaining, by the BBU, at least one updated BFW; based on at least the updated BFW, determining, by the BBU, at least one updated antenna power scaling factor; and transmitting the at least one updated antenna power scaling factor to the RU.

Example Embodiment A18. The method of Example Embodiment A17, wherein the at least one updated BFW is obtained every Orthogonal Frequency Division Multiplexing, OFDM, symbol.

Example Embodiment A19. The method of any one of Example Embodiments A1 to A18, wherein the BBU and the RU are associated with a distributed network node.

Example Embodiment A20. A BBU comprising processing circuitry configured to perform any of the methods of Example Embodiments A1 to A19.

Example Embodiment A21. A computer program comprising instructions which when executed on a computer perform any of the methods of Example Embodiments A1 to A19.

Example Embodiment A22. A computer program product comprising computer program, the computer program comprising instructions which when executed on a computer perform any of the methods of Example Embodiments A1 to A19.

Example Embodiment A23. A non-transitory computer readable medium storing instructions which when executed by a computer perform any of the methods of Example Embodiments A1 to A19.

Group B Embodiments

Example Embodiment B1. A method by a radio unit, RU, for performing beamforming for a communication between the RU and at least one wireless device, the method comprising: receiving, from a baseband unit, BBU, at least one antenna power scaling factor; applying the at least one antenna power scaling factor to scale a transmit power of a plurality of antennas; and using the plurality of antennas with the scaled transmit power to transmit a signal to the at least one wireless device.

Example Embodiment B2. The method of Example Embodiment B1, further comprising: receiving, from the BBU of the network node, a plurality of beamforming weights, BFWs, associated with at least one subcarrier, and wherein the at least one antenna power scaling factor is based on the plurality of BFWs.

Example Embodiment B3. The method of Example Embodiment B2, wherein the plurality of BFWs are associated with a subset of subcarriers within a plurality of scheduled subcarriers.

Example Embodiment B4. The method of any one of Example Embodiments B2 to B3, wherein the plurality of BFWs received from the BBU do not include a BFW for at least one scheduled subcarrier, and wherein the method further comprises: based on the plurality of BFWs received from the BBU, obtaining at least one additional BFW for at least one scheduled subcarrier for which a BFW was not received from the BBU.

Example Embodiment B5. The method of Example Embodiment B4, wherein obtaining the at least one additional BFW for the at least one scheduled subcarrier for which the BFW was not received from the BBU comprises at least one of: repeating at least one of the plurality of BFWs that is a neighbor to the at least one scheduled subcarrier for the at least one scheduled subcarrier for which a BFW was not received; and interpolating the plurality of BFWs that were received from the BBU for the at least one scheduled subcarrier for which a BFW was not received.

Example Embodiment B6. The method of any one of Example Embodiments B2 to B5, wherein the plurality of BFWs are received from the BBU before the at least one antenna power scaling factor is received from the BBU.

Example Embodiment B7. The method of any one of Embodiments B2 to B6, wherein the plurality of BFWs are compressed when received from the BBU, and the method further comprises decompressing and/or reconstructing the plurality of BFWs.

Example Embodiment B8. The method of any one of Example Embodiments B2 to B7, wherein the plurality of BFWs are received with control information for performing beamforming.

Example Embodiment B9. The method of Example Embodiment B8, wherein the control information comprises scheduling information.

Example Embodiment B10. The method of any one of Example Embodiments B1 to B9, wherein the signal transmitted to the at least one wireless device comprises a number of user-layer downlink data streams, and the method further comprises: receiving the number of user-layer downlink data streams from the BBU.

Example Embodiment B11. The method of Example Embodiment B10, wherein each one of the number of user-layer downlink data streams is transmitted to an associated one of a plurality of wireless devices.

Example Embodiment B12. The method of any one of Example Embodiments B1 to B10, further comprising: transmitting, to the BBU, information associated with a reference signal transmitted on at least one downlink channel between the RU and the at least one wireless device, the information for channel estimation of the at least one downlink channel by the BBU.

Example Embodiment B13. The method of Example Embodiment B12, wherein the reference signal comprises a sounding reference signal (SRS) or a demodulation reference signal (DMRS).

Example Embodiment B14. The method of any one of Example Embodiments B1 to B12, wherein applying the at least one antenna power scaling factor to scale the transmit power of the plurality of antennas comprises: applying a single antenna power scaling factor to scale the transmit power of at least two of the plurality of antennas.

Example Embodiment B15. The method of any one of Example Embodiments B1 to B12, applying the at least one antenna power scaling factor to scale the transmit power of the plurality of antennas comprises: applying a single antenna power scaling factor to scale the transmit power of each of the plurality of antennas.

Example Embodiment B16. The method of any one of Example Embodiments B1 to B12, wherein applying the at least one antenna power scaling factor to scale the transmit power of the plurality of antennas comprises: applying each one of a plurality of antenna power scaling factors to scale an associated one of the plurality of antennas.

Example Embodiment B17. The method of any one of Example Embodiments B1 to B16, wherein applying the at least one antenna power scaling factor to scale the transmit power of the plurality of antennas comprises applying the at least one antenna power scaling factor to the plurality of BFWs received from the BBU on IQ samples of all scheduled subcarriers.

Example Embodiment B18. The method of any one of Example Embodiments B1 to B16, wherein applying the at least one antenna power scaling factor to scale the transmit power of the plurality of antennas comprises applying the at least one antenna power scaling factor to a plurality of frequency-domain IQ samples of the signal before the signal is multiple with the BFWs associated with each antenna.

Example Embodiment B19. The method of any one of Example Embodiments B1 to B16, wherein applying the at least one antenna power scaling factor to scale the transmit power of the plurality of antennas comprises applying the at least one antenna power scaling factor to a plurality of time-domain IQ samples of the signal for each of the plurality of antennas.

Example Embodiment B20. The method of any one of Example Embodiments B1 to B19, wherein the at least one antenna power scaling factor is determined based on a power contribution of all of the plurality of BFWs on all scheduled subcarriers.

Example Embodiment B21. The method of any one of Example Embodiments B1 to B20, wherein the at least one antenna power scaling factor is received as a control-plane message.

Example Embodiment B22. The method of any one of Example Embodiments B1 to B21, further comprising: after receiving the at least one antenna power scaling factor from the BBU, receiving at least one updated BFW from the BBU; after receiving the at least one updated BFW from the BBU, receiving at least one updated antenna power scaling factor to be applied to scale the transmit power of at least one of the plurality of antennas; and using the at least one antenna with the scaled transmit power based on the updated antenna power scaling factor to transmit at least one additional signal to the at least one wireless device.

Example Embodiment B23. The method of Example Embodiment B22, wherein the at least one updated BFW is received every Orthogonal Frequency Division Multiplexing, OFDM, symbol.

Example Embodiment B24. The method of any one of Example Embodiments B1 to B23, wherein the BBU and the RU are associated with a distributed network node.

Example Embodiment B25. A BBU comprising processing circuitry configured to perform any of the methods of Example Embodiments B1 to B24.

Example Embodiment B26. A computer program comprising instructions which when executed on a computer perform any of the methods of Example Embodiments B1 to B24.

Example Embodiment B27. A computer program product comprising computer program, the computer program comprising instructions which when executed on a computer perform any of the methods of Example Embodiments B1 to B24.

Example Embodiment B28. A non-transitory computer readable medium storing instructions which when executed by a computer perform any of the methods of Example Embodiments B1 to B24.

Group C Example Embodiments

Example C1. A network node comprising: processing circuitry configured to perform any of the steps of any of the Group A and Group B Example Embodiments; power supply circuitry configured to supply power to the wireless device.

Example C2. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the Group A and Group B Example Embodiments.

Example C3. The communication system of the pervious embodiment further including the network node.

Example C4. The communication system of the previous 2 embodiments, further including the wireless device, wherein the wireless device is configured to communicate with the network node.

Example C5. The communication system of the previous 3 embodiments, wherein: the processing circuitry of the host computer is configured to execute a host application, thereby providing the user data; and the wireless device comprises processing circuitry configured to execute a client application associated with the host application.

Example C6. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the Group A and Group B Example Embodiments.

Example C7. The method of the previous embodiment, further comprising, at the network node, transmitting the user data.

Example C8. The method of the previous 2 embodiments, wherein the user data is provided at the host computer by executing a host application, the method further comprising, at the wireless device, executing a client application associated with the host application.

Example C9. A wireless device configured to communicate with a network node, the wireless device comprising a radio interface and processing circuitry configured to performs the of the previous 3 embodiments.

Example C10. A communication system including a host computer comprising a communication interface configured to receive user data originating from a transmission from a wireless device to a network node, wherein the network node comprises a radio interface and processing circuitry, the network node's processing circuitry configured to perform any of the steps of any of the Group A and Group B Example Embodiments.

Example C11. The communication system of the previous embodiment further including the network node.

Example C12. The communication system of the previous 2 embodiments, further including the wireless device, wherein the wireless device is configured to communicate with the network node.

Example C13. The communication system of the previous 3 embodiments, wherein: the processing circuitry of the host computer is configured to execute a host application; the wireless device is configured to execute a client application associated with the host application, thereby providing the user data to be received by the host computer.

Example C14. The method of any of the previous embodiments, wherein the network node comprises a base station.

Example C15. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method for antenna power scaling in a fronthaul lower-layer split, LLS, the method performed by a baseband unit (BBU) for assisting a Radio Unit (RU) in scaling a transmit power of one or more antennas when performing beamforming, the method comprising:
    obtaining a plurality of beamforming weights (BFWs) for beamforming of a signal to be transmitted to at least one wireless device via the one or more antennas;
    based on the plurality of BFWs, determining the at least one antenna power scaling factor to be applied to scale the transmit power of at least one of the antennas; and
    transmitting at least one antenna power scaling factor to the RU for scaling the transmit power of the one or more antennas,
    wherein the at least one antenna power scaling factor is determined after all of the plurality of BFWs are obtained, and
    wherein the BBU is further adapted to transmit at least one BFW of the plurality of BFWs before the at least one antenna power scaling factor is determined.

2. A method by a radio Unit (RU) comprising one or more antennas for performing beamforming for a communication between the RU and at least one wireless device, the method comprising:
    receiving, from a baseband unit (BBU) at least one antenna power scaling factor for scaling a transmit power of the one or more antennas; and
    receiving, from the BBU, a plurality of beaming forming weights (BFWs), associated with at least one subcarrier,
    wherein the at least one antenna power scaling factor is based on the plurality of BFWs, and
    wherein at least one of the plurality of BFWs is received from the BBU before the at least one antenna power scaling factor is received from the BBU.

3. A baseband unit (BBU) for assisting a Radio Unit (RU) in scaling a transmit power of one or more antennas when performing beamforming, the BBU adapted to:
    obtain a plurality of beamforming weights (BFWs) for beamforming of a signal to be transmitted to at least one wireless device via the one or more antennas;
    based on the plurality of BFWs, determine the at least one antenna power scaling factor to be applied to scale the transmit power of at least one of the antennas; and
    transmit at least one antenna power scaling factor to the RU for scaling the transmit power of the one or more antennas,
    wherein the at least one antenna power scaling factor is determined after all of the plurality of BFWs are obtained, and wherein the BBU is further adapted to transmit at least one BFW of the plurality of BFWs before the at least one antenna power scaling factor is determined.

4. The BBU of claim 3, wherein the at least one antenna power scaling factor is transmitted with at least one additional scaling factor that is not determined based on the plurality of BFWs.

5. The BBU of claim 3, further adapted to normalize the plurality of BFWs based on at least one power scaling criteria.

6. The BBU of claim 3, wherein the at least one antenna power scaling factor is determined based on a power contribution of all BFWs on all scheduled resource elements.

7. The BBU of claim 3, wherein each of the at least one antenna power scaling factor is determined after the plurality of BFWs are obtained for all scheduled resource elements.

8. The BBU of claim 3, wherein the at least one antenna power scaling factor is associated with one carrier of a plurality of carriers transmitted on the one or more antennas.

9. The BBU of claim 3, wherein the at least one antenna power scaling factor comprises at least a first antenna power scaling factor to be applied to scale the transmit power of a plurality of antennas.

10. The BBU of claim 3, wherein the at least one antenna power scaling factor comprises a plurality of antenna power scaling factors, and wherein each of the plurality of antenna power scaling factors is to be applied to scale the transmit power of an associated one of a plurality of antennas.

11. The BBU of claim 3, wherein the at least one antenna power scaling factor is transmitted via a control-plane message.

12. The BBU of claim 3, further adapted to:

after determining and transmitting the at least one antenna power scaling factor to the RU, obtain at least one updated BFW;

based on at least the updated BFW, determine at least one updated antenna power scaling factor; and transmit the at least one updated antenna power scaling factor to the RU.

13. A radio Unit (RU) comprising one or more antennas for performing beamforming for a communication between the RU and at least one wireless device, the RU adapted to:

receive, from a baseband unit (BBU), at least one antenna power scaling factor for scaling a transmit power on the one or more antennas; and receiving, from the BBU, a plurality of beaming forming weights (BFWs), associated with at least one subcarrier, wherein the at least one antenna power scaling factor is based on the plurality of BFWs, and wherein the plurality of BFWs are received from the BBU before the at least one antenna power scaling factor is received from the BBU.

14. The RU of claim 13, further adapted to:

apply the at least one antenna power scaling factor to scale the transmit power of the one or more antennas; and using the one or more antennas with the scaled transmit power to transmit a signal to the at least one wireless device.

15. The RU of claim 14, wherein when applying the at least one antenna power scaling factor to scale the antenna transmit power of the one or more antennas, the RU is adapted to:

apply a single antenna power scaling factor to scale the antenna transmit power of each of a plurality of antennas.

16. The RU of claim 14, wherein when applying the at least one antenna power scaling factor to scale the transmit power of the one or more antennas, the RU is adapted to:

apply each one of a plurality of antenna power scaling factors to scale an associated one of a plurality of antennas.

17. The RU of claim 14, wherein when applying the at least one antenna power scaling factor to scale the transmit power of the one or more antennas, the RU is adapted to:

apply the at least one antenna power scaling factor to a plurality of beamforming weights, BFWs, received from the BBU on IQ data of one or more scheduled resource elements.

18. The RU of claim 14, wherein when applying the at least one antenna power scaling factor to scale the transmit power of the one or more antennas, the RU is adapted to:

apply the at least one antenna power scaling factor to a plurality of frequency-domain IQ data of the signal before the signal is multiplied with the BFWs associated with each antenna.

19. The RU of claim 14, wherein when applying the at least one antenna power scaling factor to scale the transmit power of the one or more antennas, the RU is adapted to:

apply the at least one antenna power scaling factor to a plurality of frequency-domain IQ data of the signal after the signal is multiplied with the BFWs associated with each antenna.

20. The RU of claim 14, wherein when applying the at least one antenna power scaling factor to scale the transmit power of the one or more antennas, the RU is adapted to:

apply the at least one antenna power scaling factor to a plurality of time-domain IQ data of the signal for each of a plurality of antennas.

21. The RU of claim 14, wherein the at least one antenna power scaling factor is associated with a carrier.

22. The RU of claim 13, wherein the plurality of BFWs received from the BBU do not include a BFW for at least one scheduled subcarrier, and wherein the RU is further adapted to: based on the plurality of BFWs received from the BBU, obtain at least one additional BFW for at least one scheduled subcarrier for which a BFW was not received from the BBU.

\* \* \* \* \*